US012083806B2

(12) United States Patent
Suzuki

(10) Patent No.: US 12,083,806 B2
(45) Date of Patent: Sep. 10, 2024

(54) RECORDING APPARATUS

(71) Applicant: SEIKO EPSON CORPORATION, Tokyo (JP)

(72) Inventor: Nobutaka Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 18/057,574

(22) Filed: Nov. 21, 2022

(65) Prior Publication Data

US 2023/0158817 A1 May 25, 2023

(30) Foreign Application Priority Data

Nov. 24, 2021 (JP) ................................ 2021-189890

(51) Int. Cl.
*B41J 25/308* (2006.01)
*B41J 25/00* (2006.01)
*B41J 2/01* (2006.01)

(52) U.S. Cl.
CPC ......... *B41J 25/3088* (2013.01); *B41J 25/001* (2013.01); *B41J 2/01* (2013.01)

(58) Field of Classification Search
CPC .... B41J 25/304; B41J 25/308; B41J 25/3088; B41J 25/316
See application file for complete search history.

(56) References Cited

U.S. PATENT DOCUMENTS

2011/0279541 A1* 11/2011 Kida ........................ B41J 25/34 347/37
2017/0210155 A1* 7/2017 Nakano .............. B41J 11/00244
2018/0326730 A1* 11/2018 Kohnotoh ............ B41J 2/16588
2019/0299596 A1* 10/2019 Kohnotoh ............ B41J 2/04508

FOREIGN PATENT DOCUMENTS

JP 2020-026071 A 2/2020

* cited by examiner

*Primary Examiner* — Scott A Richmond
(74) *Attorney, Agent, or Firm* — WORKMAN NYDEGGER

(57) ABSTRACT

A recording apparatus includes a head unit including a recording head and configured to move between a recording position where recording is performed on a medium and a retraction position away from a medium transportation path; a movement mechanism that moves the head unit; and a positioning portion configured to position the head unit at the recording position. A moment for rotating the head unit is produced by a force applied by the movement mechanism to the head unit and by a reaction force received by the head unit from the positioning portion. A unit pusher configured to apply, to the head unit, a force acting in a direction of canceling rotation of the head unit when the head unit is located at the recording position pushes the head unit in a direction intersecting with a moving direction of the head unit.

8 Claims, 14 Drawing Sheets

RECORDING APPARATUS

The present application is based on, and claims priority from JP Application Serial Number 2021-189890, filed Nov. 24, 2021, the disclosure of which is hereby incorporated by reference herein in its entirety.

BACKGROUND

1. Technical Field

Embodiments of the present disclosure relate to a recording apparatus that performs recording on a medium.

2. Related Art

A structure of an ink-jet recording apparatus in which a recording head configured to eject ink moves rotatably between a maintenance position and a recording position is disclosed in JP-A-2020-026071. A head holder that holds the recording head has three pins in a side view. These pins are guided along rails, thereby causing the recording head to move rotatably between the maintenance position and the recording position. One of the three pins is in engagement with a slide member. The slide member is coupled to a slide rack gear via a spring. The slide rack gear is in mesh with a drive gear. The rotation of the drive gear causes the slide gear and the slide rack gear to move up and down.

When the head holder is located at the recording position, the head holder tends to rotate due to the own weight of the head holder, and the positional orientation of the head holder is prone to be unstable. However, the urging force of the above-mentioned spring, which is provided between the slide member and the slide rack gear, acts to cancel the rotation. This action makes the positional orientation of the head holder stable.

In the above structure disclosed in JP-A-2020-026071, in a case where an increase in the own weight of the head holder makes its positional orientation more unstable, it is possible to stabilize the positional orientation by increasing the magnitude of the urging force of the spring. However, the urging force of the spring acts in a direction that is exactly the opposite of a direction in which the drive gear drives the slide rack gear. For this reason, if the magnitude of the urging force of the spring is increased, the rated output of a motor for driving the drive gear also needs to be increased. This will result in an increase in cost and an increase in power consumption.

SUMMARY

A recording apparatus according to a certain aspect of the present disclosure includes: a medium transportation path along which a medium is transported; a recording head that performs recording on the medium transported along the medium transportation path; a head unit including the recording head and configured to move between a recording position where the recording is performed on the medium and a retraction position away from the medium transportation path; a movement mechanism that moves the head unit by applying, to the head unit, a force acting in a moving direction of the head unit; a positioning portion with which a part of the head unit moving from the retraction position toward the recording position comes into contact for positioning the head unit at the recording position; and a unit pusher that applies, to the head unit, a force acting in a direction of canceling rotation of the head unit when the head unit is located at the recording position, wherein a moment for rotating the head unit as viewed in a medium width direction intersecting with a medium transportation direction is produced by the force applied by the movement mechanism to the head unit and by a reaction force received by the head unit from the positioning portion, and the unit pusher pushes the head unit in a direction intersecting with the moving direction of the head unit.

DESCRIPTION OF EXEMPLARY EMBODIMENTS

Figure 1:
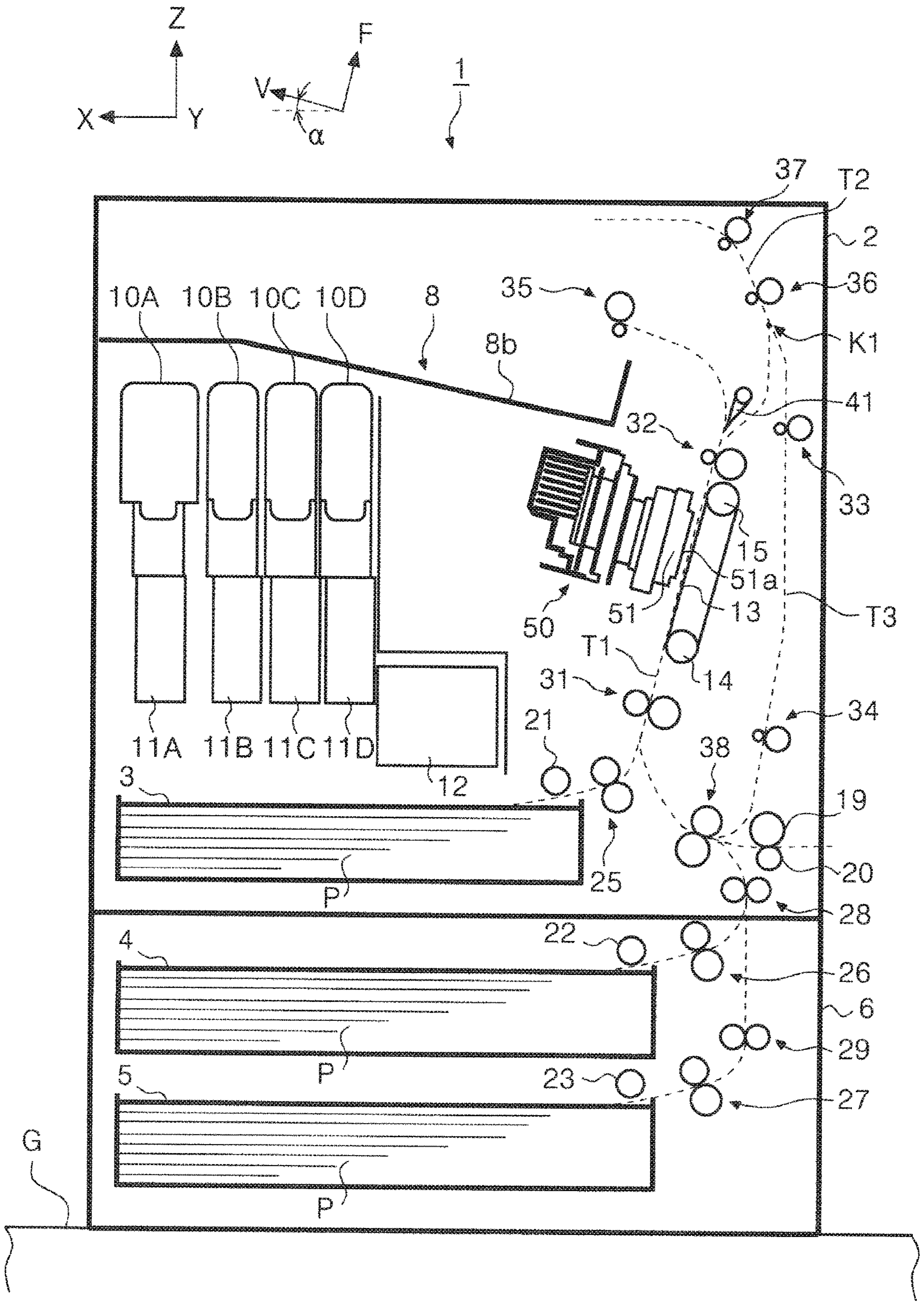
FIG. 1 is a diagram illustrating a medium transportation path of a printer in a state in which a head unit is located at a recording position.

First, a brief overview of the present disclosure is presented below.

A recording apparatus according to a first exemplary mode of the present disclosure includes: a medium transportation path along which a medium is transported; a recording head that performs recording on the medium transported along the medium transportation path; a head unit including the recording head and configured to move between a recording position where the recording is performed on the medium and a retraction position away from the medium transportation path; a movement mechanism that moves the head unit by applying, to the head unit, a force acting in a moving direction of the head unit; a positioning portion with which a part of the head unit moving from the retraction position toward the recording position comes into contact for positioning the head unit at the recording position; and a unit pusher that applies, to the head unit, a force acting in a direction of canceling rotation of the head unit when the head unit is located at the recording position, wherein a moment for rotating the head unit as viewed in a medium width direction intersecting with a medium transportation direction is produced by the force applied by the movement mechanism to the head unit and by a reaction force received by the head unit from the positioning portion, and the unit pusher pushes the head unit in a direction intersecting with the moving direction of the head unit.

In this exemplary mode, the recording apparatus includes a unit pusher that applies, to the head unit, a force acting in a direction of canceling rotation of the head unit when the head unit is located at the recording position. This makes it possible to suppress the instability in the positional orientation of the head unit due to the moment of force and thus obtain good recording quality.

Since the unit pusher behaves to cancel the rotation of the head unit by pushing the head unit in a direction intersecting with the moving direction of the head unit, it is possible to prevent the unit pusher from being obstructive to the movement of the head unit in the V-axis direction. Consequently, it is possible to prevent an increase in cost and an increase in power consumption resulting from increasing the rated output of a motor that is the power source for movement of the head unit.

A second exemplary mode is that, in the first exemplary mode, the head unit includes a first guided portion on one end portion in the medium width direction and a second guided portion and a third guided portion on an other end portion in the medium width direction with a space therebetween in the moving direction of the head unit, the first guided portion is guided in the moving direction while being supported by a first guide surface extending in the moving direction of the head unit, the second guided portion and the third guided portion are guided in the moving direction while being supported by a second guide surface extending in the moving direction, and at least in a state of being located at the recording position, the head unit is supported at three points via the first guided portion, the second guided portion, and the third guided portion.

In this exemplary mode, the head unit is supported at three points via the first guided portion, the second guided portion, and the third guided portion. Because of this structure, the positional orientation of the head unit is stable, and it is possible to obtain good recording quality.

A third exemplary mode is that, in the second exemplary mode, a position where the unit pusher applies the force to the head unit is located inside an area of a triangle having vertices at a first position, a second position, and a third position as viewed in a direction orthogonal to a plane including the first position, the second position, and the third position, the first position is a position where the first guided portion is in contact with the first guide surface, the second position is a position where the second guided portion is in contact with the second guide surface, and the third position is a position where the third guided portion is in contact with the second guide surface.

In this exemplary mode, the position where the unit pusher applies the force to the head unit is located inside an area of a triangle having vertices at the first position, the second position, and the third position. Because of this structure, the first guided portion is properly pushed against the first guide surface, the second guided portion is properly pushed against the second guide surface, and the third guided portion is properly pushed against the second guide surface. This makes the positional orientation of the head unit stable, resulting in good recording quality.

A fourth exemplary mode is that, in the third exemplary mode, the second guided portion is located at a position where the second guided portion gets lifted away from the second guide surface due to the rotation of the head unit, the third guided portion is located at a position where the third guided portion is pushed against the second guide surface due to the rotation of the head unit, and the position where the unit pusher applies the force to the head unit is located on a side closer to the second position with respect to a halfway position located between the first position and the second position in the medium width direction, and is located on a side closer to the second position with respect to a halfway position located between the second position and the third position in the moving direction.

In this exemplary mode, in a structure in which the second guided portion is located at a position where the second guided portion gets lifted away from the second guide surface due to the rotation of the head unit, the position where the unit pusher applies the force to the head unit is located on a side closer to the second position with respect to a halfway position located between the first position and the second position in the medium width direction, and is located on a side closer to the second position with respect to a halfway position located between the second position and the third position in the moving direction. Because of this structure, the head unit is pushed at the position closer to the second guided portion. Therefore, the rotation of the head unit is suppressed properly.

A fifth exemplary mode is that, in any of the first to fourth exemplary modes, the unit pusher includes a rotary member provided rotatably on the head unit and having a free end, a spring provided on the head unit and configured to push the rotary member in a direction in which the free end goes away from the head unit, and a contact member provided independently of the head unit and configured to come into contact with the rotary member when the head unit is located at the recording position, and the force acting in the direction of canceling the rotation of the head unit is applied to the head unit by a force of the spring.

In this exemplary mode, the unit pusher includes the rotary member, the spring, and the contact member. Therefore, it is possible to make the structure of the unit pusher simple.

A sixth exemplary mode is that, in the fifth exemplary mode, a centerline of a rotation shaft of the rotary member extends in the medium width direction, the free end is located on a side closer to the retraction position with respect to the rotation shaft in the moving direction of the head unit, and the contact member moves in relation to the rotary member from the rotation shaft toward the free end when the head unit moves from the retraction position to the recording position.

In this exemplary mode, the contact member moves in relation to the rotary member from the rotation shaft toward the free end when the head unit moves from the retraction position to the recording position. Because of this structure, the magnitude of the force applied by the unit pusher to the head unit increases gradually when the head unit moves from the retraction position to the recording position. Such a gradual increase in the magnitude of the pushing force makes it possible to avoid a heavy load from being applied suddenly when the head unit moves to the recording position, thereby ensuring smooth movement of the head unit to the recording position.

A seventh exemplary mode is that, in the sixth exemplary mode, the recording apparatus further includes a rotation restriction portion that restricts rotation of the rotary member in the direction in which the free end of the rotary member goes away from the head unit.

In this exemplary mode, the recording apparatus further includes a rotation restriction portion that restricts rotation of the rotary member in the direction in which the free end of the rotary member goes away from the head unit. Because of this structure, it is possible to make a contact angle smaller when the contact member comes into contact with the rotary member. The smaller contact angle further enhances the effect of avoiding a heavy load from being applied suddenly when the head unit moves to the recording position.

An eighth exemplary mode is that, in any of the first to seventh exemplary modes, the head unit includes a unit body including the recording head and configured to come into contact with the positioning portion, a displacement member whose relative position in relation to the unit body is configured to be changed in the moving direction of the head unit, and a pushing member provided between the unit body and the displacement member and configured to push the unit body toward the positioning portion when the head unit is located at the recording position, and the movement mechanism applies, to the displacement member, an external force for moving the head unit.

In this exemplary mode, the movement mechanism indirectly causes the head unit to move via the displacement member. Because of this structure, high stop precision is not required when stopping the head unit moved to the recording position by the movement mechanism in a state in which the unit body has come into contact with the positioning portion. This makes the position control of the head unit easier.

Next, embodiments of the present disclosure will now be explained with specific examples.

An ink-jet printer 1 that performs recording by ejecting ink, which is an example of liquid, onto a medium such as recording paper will be described below as an example of a recording apparatus. In the description below, a shorter term "printer 1" will be used for the ink-jet printer 1.

The X-Y-Z coordinate system shown in each of the accompanying drawings is an orthogonal coordinate system. The Y-axis direction of the coordinate system represents a medium width direction intersecting with a medium transportation direction. The medium width direction is the same as an apparatus depth direction. The direction from the front toward the rear of the apparatus is defined as the +Y direction, which is one of the Y-axis direction. The direction from the rear toward the front of the apparatus is defined as the −Y direction, which is the other of the Y-axis direction. In the present embodiment, the Y-axis direction is an example of a width direction intersecting with the V-axis direction, in which a head unit 50 to be described later is configured to move.

The X-axis direction represents an apparatus width direction. As viewed from an operator of the printer 1, the +X direction is the direction toward the left-hand side, and the −X direction is the direction toward the right-hand side. The Z-axis direction represents a vertical direction and is normal to a surface G on which the printer 1 is installed. Namely, the Z-axis direction represents an apparatus height direction. The +Z direction, one of Z-axis direction, is the direction going upward. The −Z direction, the other, is the direction going downward.

Figure 2:
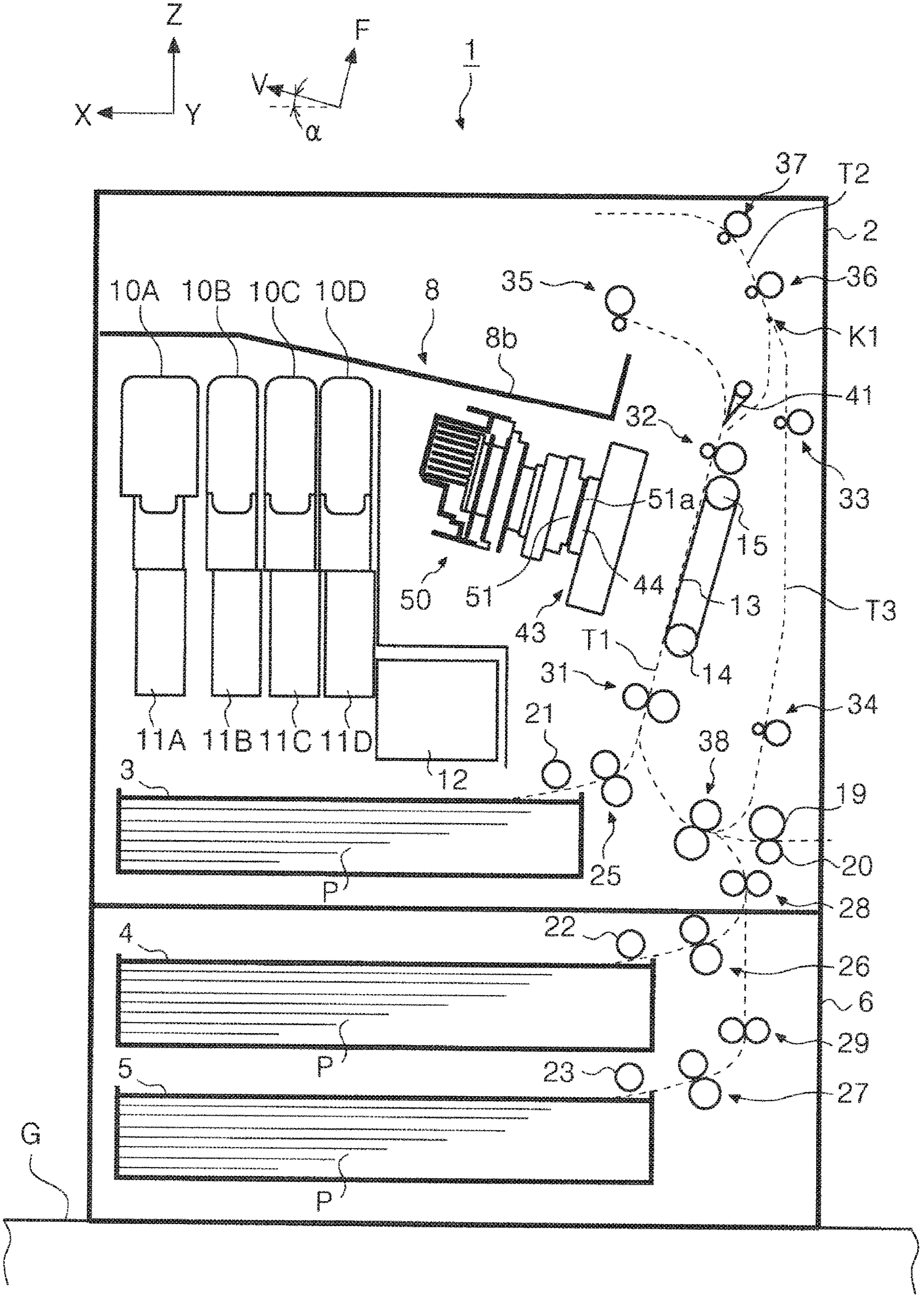
FIG. 2 is a diagram illustrating the medium transportation path of the printer in a state in which the head unit is located at a retraction position.

In the description below, the direction in which a medium is transported may be referred to as "downstream". The opposite direction may be referred to as "upstream". In FIGS. 1 and 2, a medium transportation path are indicated by broken-line curves. In the printer 1, the medium is transported along the medium transportation path indicated by the broken-line curves in FIGS. 1 and 2.

The F-axis direction represents the medium transportation direction at a space between a line head 51 to be described later and a transportation belt 13 to be described later, that is, at a recording region. The +F direction goes downstream in the transportation direction. The −F direction, the opposite of the +F direction, goes upstream in the transportation direction. The V-axis direction, in which the head unit 50 to be described later is configured to move, is orthogonal to the F-axis direction. The +V direction, one of the V-axis direction, is the direction in which the head unit 50 goes away from a "during-recording" transportation path T1. The −V direction, the other, is the direction in which the head unit 50 comes toward the during-recording transportation path T1.

In some of the accompanying drawings, the F-V-Y coordinate system will be used instead of the X-Y-Z coordinate system.

With reference to FIG. 1, the medium transportation path in the printer 1 will now be explained. The printer 1 is configured such that an add-on unit 6 can be coupled thereto under its body 2. A state in which the add-on unit 6 is coupled is illustrated in FIGS. 1 and 2.

The printer body 2 has, at its lower portion, a first medium cassette 3 configured to contain sheets of a medium. When the add-on unit 6 is coupled under the printer body 2, a second medium cassette 4 and a third medium cassette 5 are provided under the first medium cassette 3.

Each of these medium cassettes is provided with a pick roller that feeds out the medium contained in it in the −X direction. Pick rollers 21, 22, and 23 are provided respectively for the first medium cassette 3, the second medium cassette 4, and the third medium cassette 5.

For each of these medium cassettes, a corresponding pair of feed rollers configured to feed, obliquely upward, the medium having been fed in the −X direction is provided. Pairs of feed rollers 25, 26, and 27 are these corresponding pairs of feed rollers provided respectively for the first medium cassette 3, the second medium cassette 4, and the third medium cassette 5.

The term "pair of rollers" used below means a pair that is made up of a driving roller and a driven roller, wherein the driving roller is driven by a motor that is not illustrated, and the driven roller is in contact with the driving roller and rotates as a slave by receiving a driving force for rotation from the driving roller when the driving roller rotates, unless otherwise described.

The medium fed out of the third medium cassette 5 is sent to a pair of transportation rollers 38 by a pair of transportation rollers 29 and then by a pair of transportation rollers 28. The medium fed out of the second medium cassette 4 is sent to the pair of transportation rollers 38 by the pair of transportation rollers 28. The medium is nipped by the pair of transportation rollers 38 and is then sent to a pair of transportation rollers 31.

The medium fed out of the first medium cassette 3 is sent to the pair of transportation rollers 31 by the pair of feed rollers 25 without going through the pair of transportation rollers 38.

A supply roller 19 and a separation roller 20, which are provided near the pair of transportation rollers 38, make up a roller pair configured to feed a medium from a supply tray that is not illustrated in FIGS. 1 and 2.

The medium that receives a transportation force from the pair of transportation rollers 31 is sent to the space between the line head 51, which is an example of a recording head, and the transportation belt 13. That is, the medium is sent to the position where it faces the line head 51. The medium transportation path from the pair of transportation rollers 31 to a pair of transportation rollers 32 is herein referred to as the during-recording transportation path T1.

The line head 51 is a component of the head unit 50. The line head 51 performs recording by ejecting ink, which is an example of liquid, onto a surface of the medium. The line head 51 is an ink ejecting head configured such that nozzles for ejecting ink are arranged throughout the entire area in the medium width direction. The line head 51, as an ink ejecting head having such a structure, is capable of performing recording throughout the entire area in the medium width direction without moving in the medium width direction. However, the ink ejecting head is not limited to a line head. The ink ejecting head may be a serial-type head that is mounted on a carriage and ejects ink while moving in the medium width direction.

The head unit 50 is provided in such a way as to be able to advance toward and retract from the during-recording transportation path T1. Accordingly, the head unit 50 is movable between a recording position, at which the head unit 50 having advanced toward the during-recording transportation path T1 performs recording, and a retraction position, which is away from the during-recording transportation path T1.

FIG. 1 illustrates a state in which the head unit 50 is located at the recording position. In this state, the head unit 50 performs recording on the medium. FIG. 2 illustrates a state in which the head unit 50 is located at the retraction position. The head position illustrated in FIG. 2 is a position where the head unit 50 is located when operation for wiping an ink ejecting surface 51*a* of the line head 51 is performed.

Figure 9:
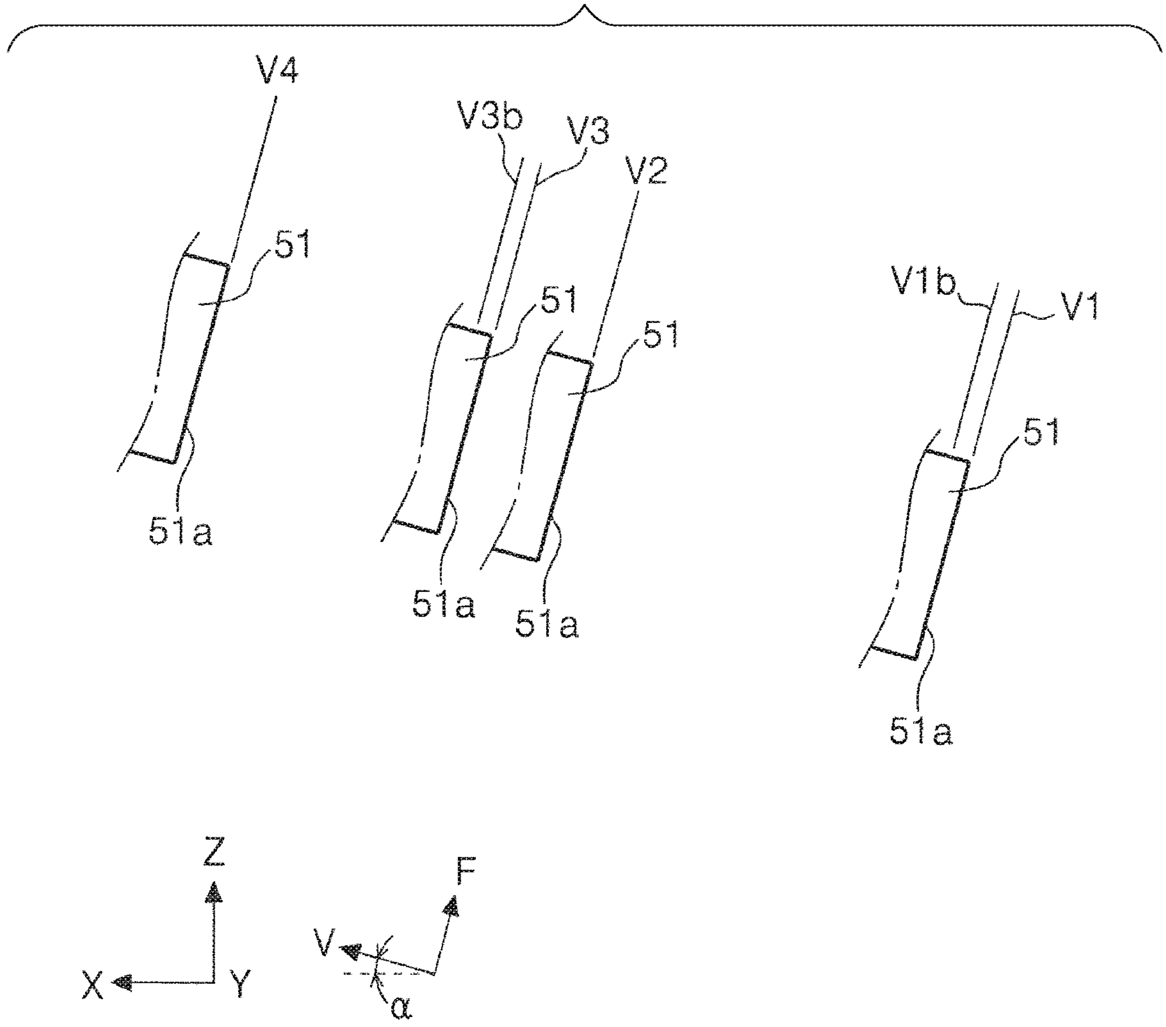
FIG. 9 is a diagram schematically illustrating a movement area and positions of the head unit.

With reference to FIG. 9, a range of movement of the head unit 50 will now be explained. FIG. 9 schematically illustrates the range of movement of the head unit 50. In FIG. 9, each position of the head unit 50 in the V-axis direction is illustrated based on the position of its ink ejecting surface 51*a* in the V-axis direction.

In FIG. 9, the position V1 is the most-advanced position of the head unit 50 when located closest to the during-recording transportation path T1. The position V1 is an example of the recording position and corresponds to the position of the head unit 50 illustrated in FIG. 1. The recording position is adjustable by adjustment cams 80 to be described later (see FIG. 10). The position V1*b* is the most +V-directional-side position within an adjustable range of the recording position. In FIG. 9, the illustration of the line head 51 when at the position V1*b* is omitted. Recording is performed on the medium when the head unit 50 is located at the position V1, the position V1*b*, or somewhere between the position V1 and the position V1*b*.

The position V4 is the farthest position, most distant from the during-recording transportation path T1 in the +V direction, of the head unit 50. The position V4 is an example of the retraction position. The head unit 50 is attachable and detachable when at the position V4. The attachment of detachment of the head unit 50 will be described later.

The position V2 is a position for wiping the ink ejecting surface 51*a* of the line head 51. The position V2 is another example of the retraction position. FIG. 2 illustrates a state in which the head unit 50 is located at the position V2. In FIG. 2, the reference numeral 43 denotes a wiper unit, and the reference numeral 44 denotes a wiper provided on the wiper unit 43. The wiper 44 is made of an elastic material such as a rubber, elastomer, or the like. The wiper 44 is able to be held in contact with, while being pressed against, the ink ejecting surface 51*a* due to its elasticity.

The wiper unit 43 is movable in the Y-axis direction, which is the direction along the ink ejecting surface 51*a*, by being driven by a motor that is not illustrated. The wiper unit 43 has its home position at the +Y-side end of its movable area. Except for during wiping, the wiper unit 43 is located at the home position. Due to the movement of the wiper unit 43 in the Y-axis direction, the ink ejecting surface 51*a* is wiped by the wiper 44.

The position V3 is a position for capping the ink ejecting surface 51*a* by means of a cap that is not illustrated. The position V3 is another example of the retraction position. The position V3*b* is a position for performing flushing operation into the non-illustrated cap, that is, a position for ejecting ink from all of ink ejecting nozzles (not illustrated) of the line head 51. The position V3*b* is another example of the retraction position. In FIG. 9, the illustration of the line head 51 when at the position V3*b* is omitted.

Referring back to FIGS. 1 and 2, reference signs 10A, 10B, 10C, and 10D denote ink containers as an example of "liquid container". Ink to be ejected from the line head 51 is supplied to the line head 51 from each ink container through a corresponding tube that is not illustrated. The ink containers 10A, 10B, 10C, and 10D are provided detachably on attachment portions 11A, 11B, 11C, and 11D respectively.

The reference numeral 12 denotes a waste liquid container for serving as a reservoir for, as an example of waste liquid, ink having been ejected from the line head 51 into the non-illustrated flushing cap for the purpose of maintenance.

The transportation belt 13 is an endless belt wound around pulleys 14 and 15. Either one of the pulleys 14 and 15 is, or both are, driven by a motor that is not illustrated. The transportation belt 13 turns due to this drive force. The medium is transported through a position where it faces the line head 51 while being held by adsorption on the belt surface of the transportation belt 13. Known methods such as an air vacuuming method, an electrostatic chuck method, and the like can be used for holding the medium by adsorption on the belt surface of the transportation belt 13.

The during-recording transportation path T1, which goes through the position where the medium is to face the line head 51, intersects with both the horizontal direction and the vertical direction. The medium is transported upward along the during-recording transportation path T1. Therefore, the V-axis direction, in which the head unit 50 is configured to move, also intersects with both the horizontal direction and the vertical direction. The angle of inclination a of the V-axis direction with respect to the horizontal direction is less than 45°, more specifically, approximately 15°.

This structure makes it possible to strike a good balance between horizontal size and vertical size of a space required for movement of the head unit 50 and thus makes it possible to prevent the size of the apparatus from being extremely large in the horizontal direction and the vertical direction.

The scope of the present disclosure is not limited to the above example. The V-axis direction may be parallel to the horizontal direction.

An ejection tray 8 forming a supporting surface **8*b* configured to support the supporting surface 8*b* ejected from the medium transportation path is provided over the head unit 50. The supporting surface 8*b* extends in the V-axis direction, in which the head unit 50 is configured to move. Because of this structure, a dead space is not formed in a relationship between the ejection tray 8 and the movement area of the head unit 50**.

Moreover, since a part of the head unit 50 overlaps with the ink containers 10A, 10B, 10C, and 10D in the Z-axis direction, it is possible to reduce the apparatus size in the Z-axis direction.

Next, after recording on the first side of the sheet of the medium by the line head 51, the medium is transported by a pair of transportation rollers 32 located downstream of the transportation belt 13.

A flap 41 is provided downstream of the pair of transportation rollers 32. The medium transportation direction is switched by the flap 41. When the medium is to be ejected without any further recording, the medium transportation path is switched by the flap 41 toward the pair of transportation rollers 35 located above it. In this case, the medium is ejected onto the ejection tray 8 by the pair of transportation rollers 35.

When recording is to be performed on the second side of the medium in addition to the first side, the medium transportation direction is switched by the flap 41 toward a branch position K1. The medium passes through the branch position K1 to enter a switchback path T2. In the present embodiment, the switchback path T2 is a medium transportation path located above the branch position K1. Pairs of transportation rollers 36 and 37 are provided on the switchback path T2. The medium having entered the switchback path T2 is transported upward by the pairs of transportation rollers 36 and 37. Upon the passing of the trailing edge of the medium through the branch position K1, the rotating direction of the pairs of transportation rollers 36 and 37 is switched, thereby changing the medium transportation direction to a downward direction.

A turnover path T3 is connected to the switchback path T2. In the present embodiment, the turnover path T3 is a medium transportation path leading from the branch position K1 to the pair of transportation rollers 38 through pairs of transportation rollers 33 and 34.

The medium transported downward from the branch position K1 receives a transportation force from the pairs of transportation rollers 33 and 34 to reach the pair of transportation rollers 38, and is then turned over along the curve to be sent to the pair of transportation rollers 31.

The medium is sent to the position where it faces the line head 51 again. At this position, the second side, which is the opposite of the already-recorded first side, of the medium faces the line head 51. This makes it possible to perform recording on the second side of the medium by means of the line head 51.

Next, a movement mechanism 60 configured to move the head unit 50 in the V-axis direction will now be explained.

Figure 3:
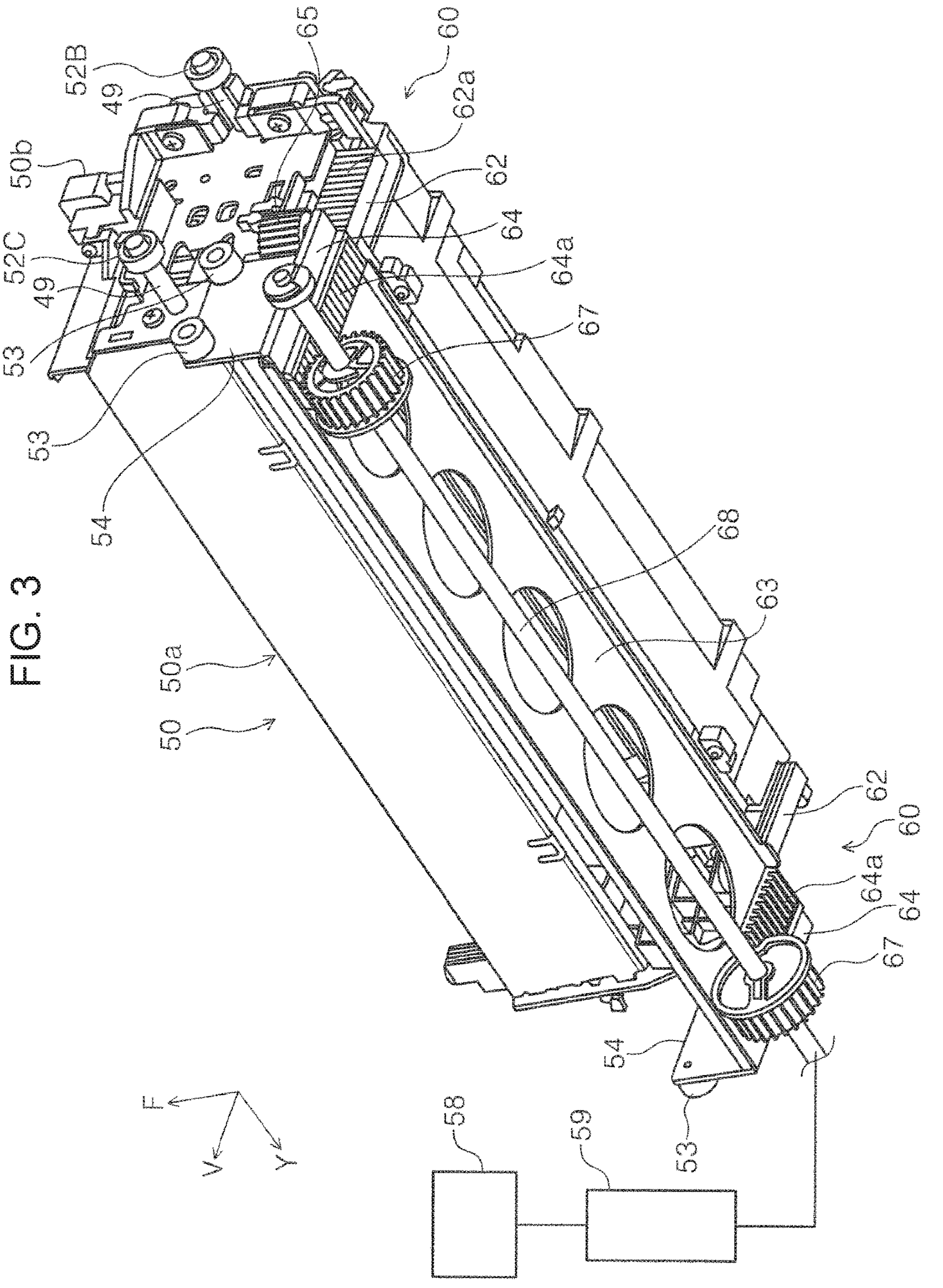
FIG. 3 is a perspective view illustrating the head unit and a movement mechanism in the state in which the head unit is located at the recording position.
Figure 4:
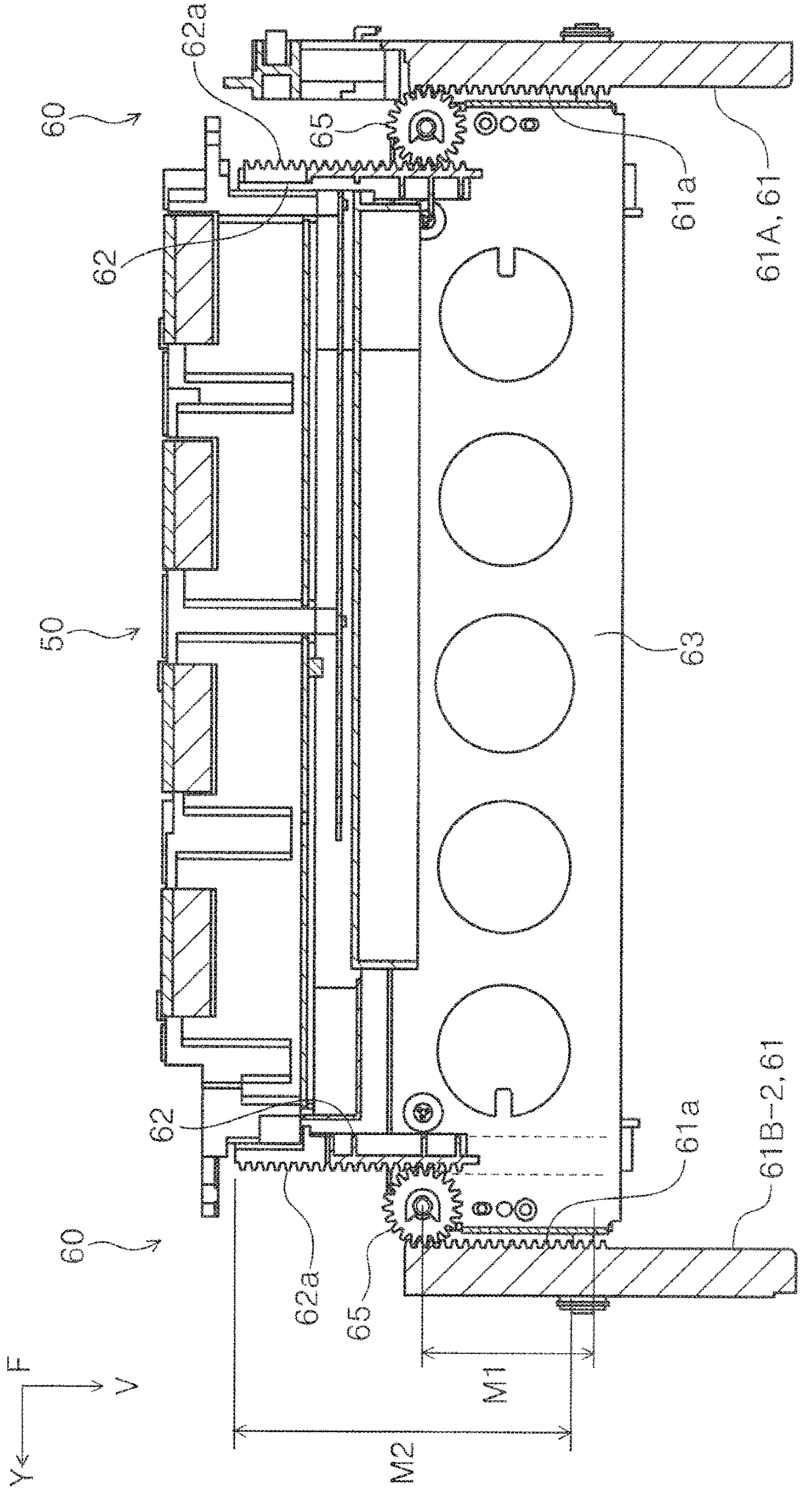
FIG. 4 is a cross-sectional view illustrating the head unit and the movement mechanism in the state in which the head unit is located at the recording position.
Figure 5:
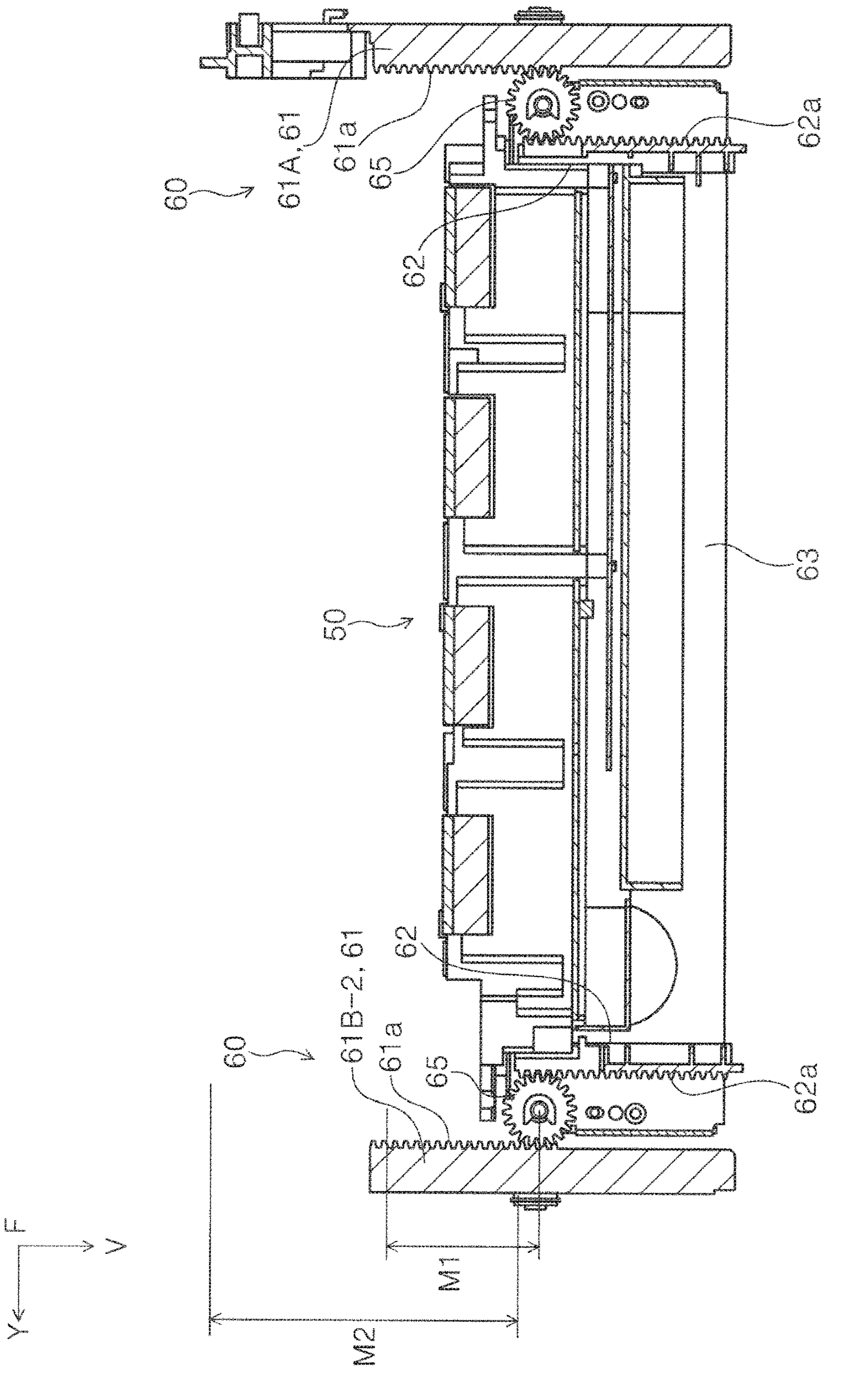
FIG. 5 is a cross-sectional view illustrating the head unit and the movement mechanism in the state in which the head unit is located at the retraction position.

The movement mechanism 60 includes a right guide member 61A, a second left guide member 61B-2, a second member 63, and first pinions 65, which are illustrated in FIGS. 4 and 5, and third rack forming members 64, and second pinions 67, which are illustrated in FIG. 3. The movement mechanism 60 is configured such that the first pinions 65 apply an external force in a moving direction to second rack forming members 62, a component of the head unit 50.

The second rack forming member 62 is an example of a displacement member. The second rack forming members 62 and a unit body **50*a* constitute the head unit 50. The head unit 50 includes the unit body 50*a*, which includes the line head 51, and the second rack forming members 62**.

A relative position between the second rack forming members 62 and the unit body **50*a*** is changeable in the V-axis direction. This will be described later.

Figure 8:
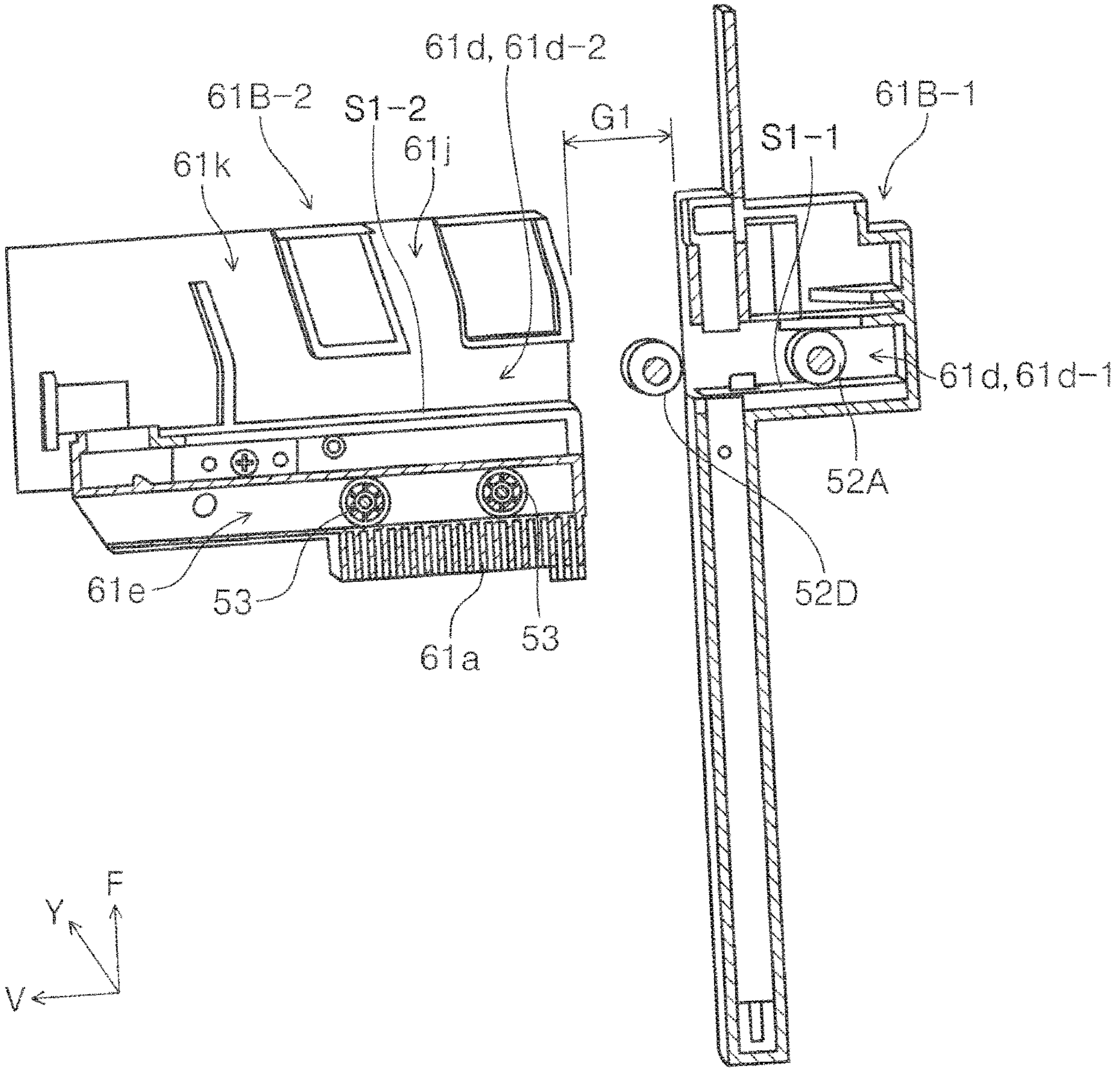
FIG. 8 is a cross-sectional perspective view illustrating a first left guide member and a second left guide member in the state in which the head unit is located at the recording position.

A first left guide member 61B-1 illustrated in FIG. 8 is provided on the −V-directional side with respect to the second left guide member 61B-2. In the description below, the right guide member 61A, the first left guide member 61B-1, and the second left guide member 61B-2 may be hereinafter referred to as "guide member 61" when there is no need to distinguish them from one another.

The guide member 61 is provided in a fixed manner on the frame of the apparatus (not illustrated).

First, a structure for guiding the head unit 50 in the V-axis direction will now be explained.

On the −Y-side lateral portion of the head unit 50 in the Y-axis direction, that is, on the side portion facing the right guide member 61A, a second guided roller 52B and a third guided roller 52C are provided as illustrated in FIG. 3. Each of the second guided roller 52B and the third guided roller 52C is provided on a corresponding shaft 49 protruding in the −Y direction. Each of the second guided roller 52B and the third guided roller 52C is a bearing provided on the shaft 49 in such a way as to be able to rotate freely. The second guided roller 52B and the third guided roller 52C are spaced apart from each other in the V-axis direction. The second guided roller 52B is located on the −V-directional side with respect to the third guided roller 52C.

The second guided roller 52B is an example of a second guided portion. The third guided roller 52C is an example of a third guided portion.

Figure 6:
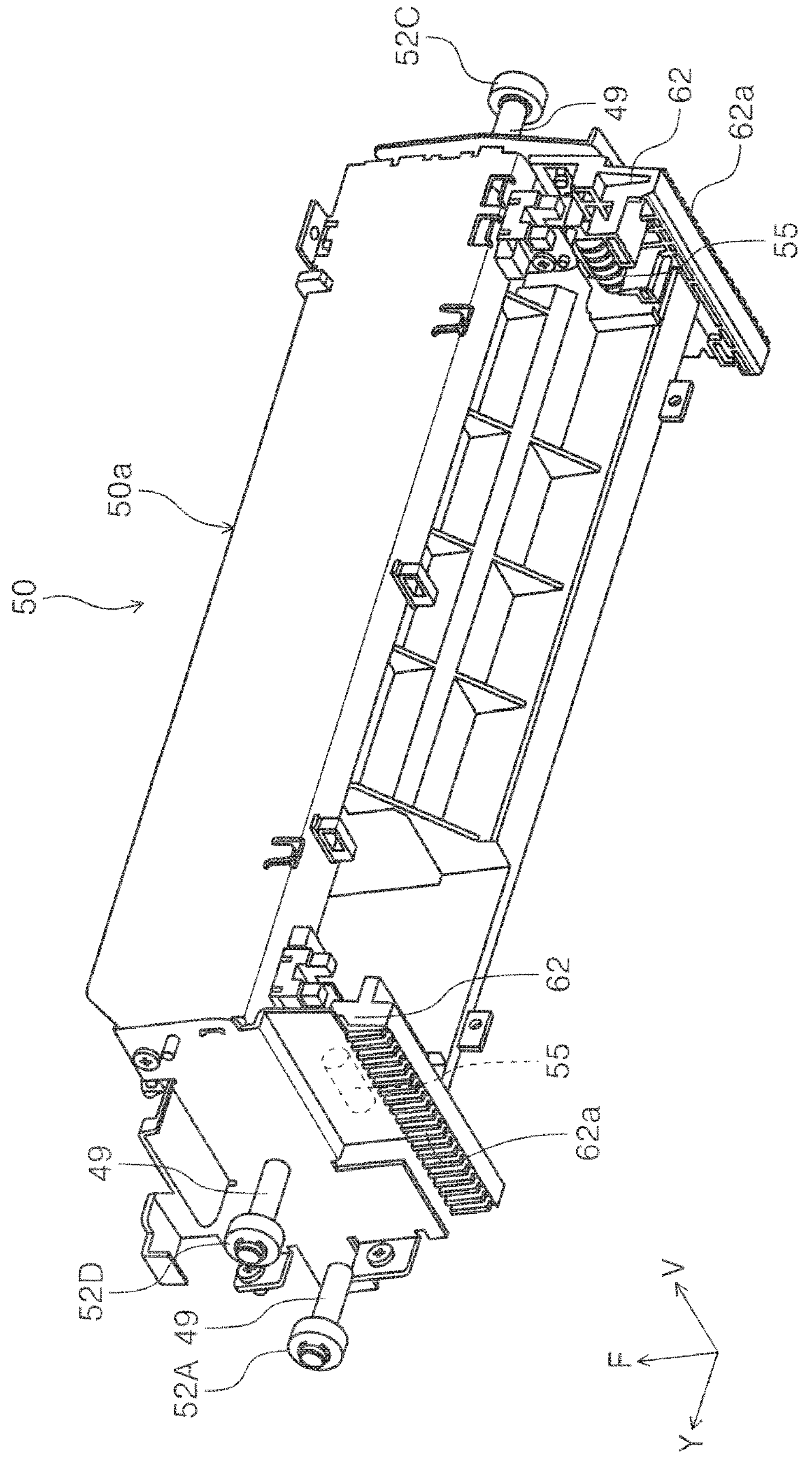
FIG. 6 is a perspective view illustrating the head unit.

On the +Y-side lateral portion of the head unit 50 in the Y-axis direction, that is, on the side portion facing the first left guide member 61B-1 and the second left guide member 61B-2, a first guided roller 52A and a fourth guided roller 52D are provided as illustrated in FIG. 6. In FIG. 6, the head unit 50 only is illustrated with omission of the movement mechanism 60 illustrated in FIG. 3.

Each of the first guided roller 52A and the fourth guided roller 52D is provided on a corresponding shaft 49 protruding in the +Y direction. Each of the first guided roller 52A and the fourth guided roller 52D is a bearing provided on the shaft 49 in such a way as to be able to rotate freely. The first guided roller 52A and the fourth guided roller 52D are spaced apart from each other in the V-axis direction. The first guided roller 52A is located on the −V-directional side with respect to the fourth guided roller 52D.

The first guided roller 52A is an example of a first guided portion.

Figure 7:
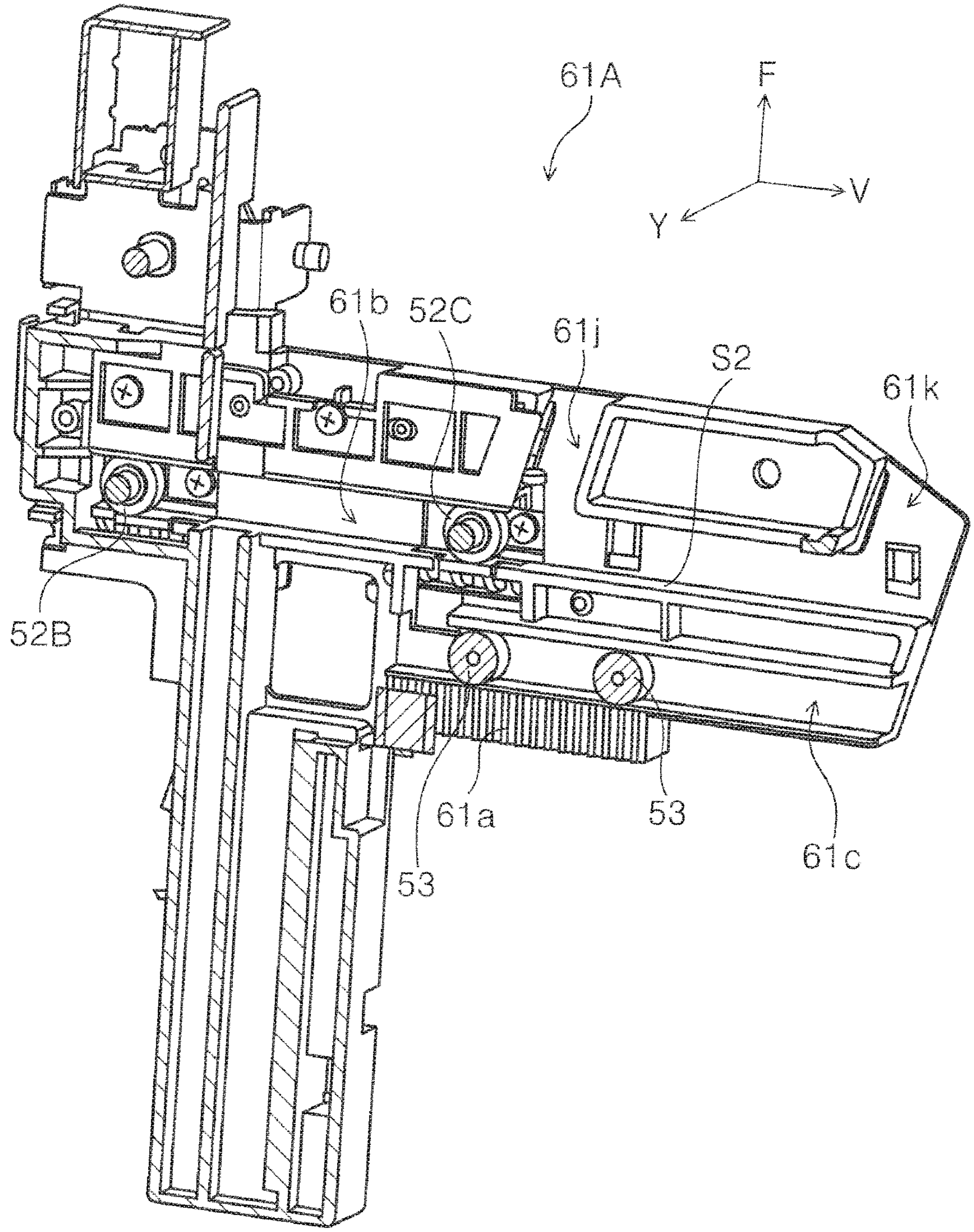
FIG. 7 is a cross-sectional perspective view illustrating a right guide member in the state in which the head unit is located at the recording position.

As illustrated in FIG. 7, a first right guide groove **61*b* is formed in the V-axis direction in the right guide member 61A disposed to face the −Y-side lateral portion of the head unit 50. The second guided roller 52B and the third guided roller 52C, which are provided on the −Y-side lateral portion of the head unit 50 as described above, are inserted in the first right guide groove 61*b*, and, because of this structure, the −Y-side lateral portion of the head unit 50 is guided by the first right guide groove 61*b*** in the V-axis direction.

The reference sign S2 denotes the lower surface of the first right guide groove **61*b*. This surface will be hereinafter referred to as "second guide surface". The second guided roller 52B and the third guided roller 52C are supported by the second guide surface S2 and receive a reaction force from the second guide surface S2**.

Figure 10:
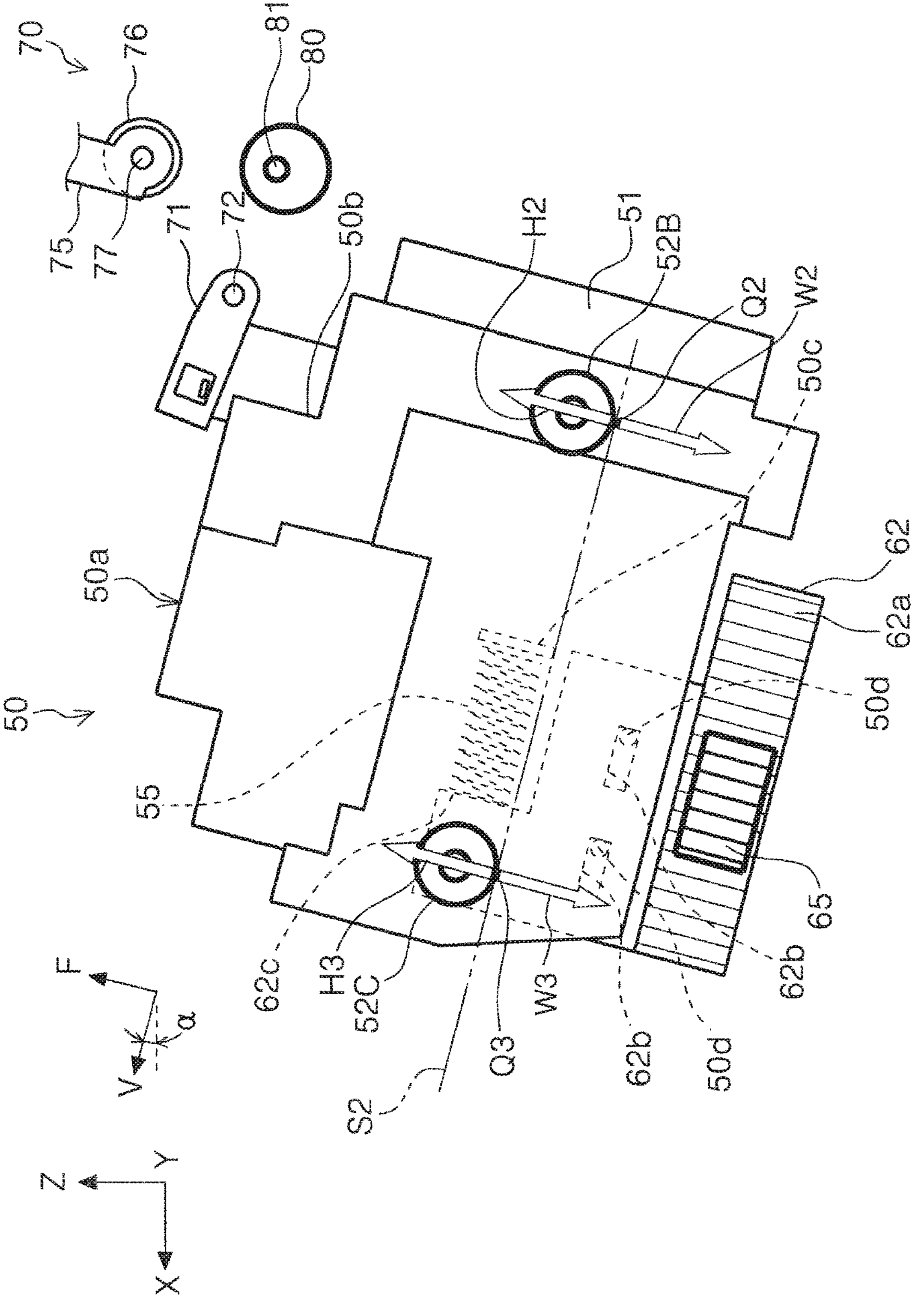
FIG. 10 is a side view illustrating the head unit and a unit pusher in a state in which the head unit is located before the recording position.

A normal force which the second guided roller 52B receives from the second guide surface S2 is indicated by an arrow with the reference sign H2 in FIG. 10. A normal force which the third guided roller 52C receives from the second guide surface S2 is indicated by an arrow with the reference sign H3 in FIG. 10. In addition, an arrow with the reference sign W2 in FIG. 10 indicates a force of contact of the second guided roller 52B with the second guide surface S2, perpendicularly thereto, due to the own weight of the head unit 50, and an arrow with the reference sign W3 in FIG. 10 indicates a force of contact of the third guided roller 52C with the second guide surface S2, perpendicularly thereto, due to the own weight of the head unit 50.

The greater the angle of inclination a of the V-axis direction with respect to the horizontal direction is, the less the magnitude of the normal force H2, the normal force H3, the force W2, and the force W3 is.

Next, as illustrated in FIG. 8, a first left guide groove 61*d* is formed in the V-axis direction in the first left guide member 61B-1 and the second left guide member 61B-2, which are disposed to face the +Y-side lateral portion of the head unit 50. The first left guide member 61B-1 is located on the −V-directional side with respect to the second left guide member 61B-2, and there is a gap G1 between the first left guide member 61B-1 and the second left guide member 61B-2 in the V-axis direction. Therefore, the first left guide groove 61*d* is in a state of being split in a range of the gap G1. In FIG. 8, the first left guide groove formed in the first left guide member 61B-1 is denoted as 61*d*-1, and the first left guide groove formed in the second left guide member 61B-2 is denoted as 61*d*-2. However, they may be hereinafter collectively referred to as the first left guide groove 61*d*.

The gap G1 is a clearance for allowing the wiper unit 43 described earlier with reference to FIG. 2 to move in the Y-axis direction while passing between the first left guide member 61B-1 and the second left guide member 61B-2.

The first guided roller 52A and the fourth guided roller 52D, which are provided on the +Y-side lateral portion of the head unit 50, are inserted in the first left guide groove 61*d*, and, because of this structure, the +Y-side lateral portion of the head unit 50 is guided by the first left guide groove 61*d* in the V-axis direction.

The reference sign S1-1 denotes the lower surface of the first left guide groove 61*d*-1. The reference sign S1-2 denotes the lower surface of the first left guide groove 61*d*-2. Both the surface S1-1 and the surface S1-2 will be hereinafter referred to as "first guide surface". The first guide surface S1-1, S1-2 is a surface parallel to the second guide surface S2.

The first guided roller 52A and the fourth guided roller 52D are supported by the first guide surface S1-1 or the first guide surface S1-2 and receive a reaction force from the first guide surface S1-1 or the first guide surface S1-2.

FIG. 8 illustrates a state in which the head unit 50 is located at the recording position. In this state, as illustrated therein, the first guided roller 52A is located inside the first left guide groove 61*d*-1 and is supported by the first guide surface S1-1, whereas the fourth guided roller 52D is located inside the gap G1 and is supported neither by the first guide surface S1-1 nor by the first guide surface S1-2.

Therefore, when the head unit 50 is located at the recording position, the head unit 50 is supported at one point via the first guided roller 52A on its +Y-side lateral portion and at two points via the second guided roller 52B and the third guided roller 52C on its −Y-side lateral portion, namely, at three points in total.

As is clear from FIG. 8, when the head unit 50 moves from the recording position to the retraction position, the first guided roller 52A and the fourth guided roller 52D enter the first left guide groove 61*d*-2 and are supported by the first guide surface S1-2.

Since the gap G1 is narrower than the interval between the first guided roller 52A and the fourth guided roller 52D in the V-axis direction, on the +Y-side lateral portion of the head unit 50, either one of the first guided roller 52A and the fourth guided roller 52D is, or both are, supported by the first guide surface S1-1 or the first guide surface S1-2.

A third guide groove 61*j* and a fourth guide groove 61*k* are formed in the second left guide member 61B-2 in a direction intersecting with the first left guide groove 61*d*. When the head unit 50 moves to the most-retracted position in the +V direction, the first guided roller 52A faces the third guide groove 61*j*, and the fourth guided roller 52D faces the fourth guide groove 61*k*. In this state, the first guided roller 52A can be moved upward along the third guide groove 61*j*, and the fourth guided roller 52D can be moved upward along the fourth guide groove 61*k*.

Similarly, in the right guide member 61A described earlier with reference to FIG. 7, a third guide groove 61*j* and a fourth guide groove 61*k* are formed in a direction intersecting with the first right guide groove 61*b*. When the head unit 50 moves to the most-retracted position in the +V direction, the second guided roller 52B faces the third guide groove 61*j*, and the third guided roller 52C faces the fourth guide groove 61*k*. In this state, the second guided roller 52B can be moved upward along the third guide groove 61*j*, and the third guided roller 52C can be moved upward along the fourth guide groove 61*k*.

The third guide groove 61*j* and the fourth guide groove 61*k* are formed almost in the F-axis direction, though slightly at an angle with respect to the F-axis direction.

With the above structure, the head unit 50 having been moved to the most-retracted position in the +V direction can be detached upward. Moreover, at this position, the head unit 50 can be mounted onto the printer body 2 by going through procedures opposite of the case of detachment. The third guide groove 61*j* and the fourth guide groove 61*k* serve as guides for guiding the head unit 50 in the attachment/detachment direction.

Since the head unit 5*o* is configured to be detachably attached to the printer body 2, the maintenance/replacement of the head unit 50 is easy.

Next, as illustrated in FIGS. 4 and 5, on the guide member 61, a first rack 61*a* is formed in the V-axis direction on its side facing the head unit 50.

The second rack forming member 62 is provided on each of the two ends of the head unit 50 in the Y-axis direction. A second rack 62*a* is formed on the second rack forming member 62 in the V-axis direction. The first rack 61*a* and the second rack 62*a* face each other. The first pinion 65 is disposed between the first rack 61*a* and the second rack 62*a*. The first pinion 65 is in mesh with both the first rack 61*a* and the second rack 62*a*.

The face-width direction of all of the first rack 61*a*, the second rack 62*a*, and the first pinion 65 is along the F-axis direction, which is orthogonal to the moving direction of the head unit 50.

The first pinion 65 is provided rotatably on the second member 63. As illustrated in FIG. 3, a lower-roller support member 54 is provided on each of the two ends of the second member 63 in the Y-axis direction. Two lower rollers 53 are provided on the lower-roller support member 54, with a space therebetween in the V-axis direction. The lower roller 53 is a driven roller supported by the lower-roller support member 54 in such a way as to be able to rotate freely.

The two lower rollers 53 provided on the −Y-side lateral portion of the head unit 50 are inserted in a second right guide groove 61*c* formed in the V-axis direction in the right guide member 61A as illustrated in FIG. 7 and is guided by the second right guide groove 61*c* in the V-axis direction.

The two lower rollers 53 provided on the +Y-side lateral portion of the head unit 50 are inserted in a second left guide groove 61*e* formed in the V-axis direction in the second left guide member 61B-2 as illustrated in FIG. 8 and is guided by the second left guide groove 61*e* in the V-axis direction.

As illustrated in FIG. 3, the third rack forming members 64 are provided under the second member 63. A third rack 64*a* is formed on the bottom of the third rack forming member 64 in the V-axis direction. The face-width direction of the third rack 64*a* is along the Y-axis direction. The second pinion 67 is in mesh with the third rack 64*a*.

The third rack forming member 64 is provided on the bottom of the second member 63 at each of the two ends in the Y-axis direction. On a rotation shaft 68 having its rotational axis parallel to the Y-axis direction, the second pinion 67 is provided at a position where it faces the third rack 64*a*. The two second pinions 67 are configured to rotate simultaneously due to the rotation of the rotation shaft 68. The power of a motor 59 is transmitted to the rotation shaft 68 via a gear mechanism that is not illustrated in FIG. 3.

In FIG. 3, the reference numeral 58 denotes a control unit that controls the motor 59. Based on a signal received from a reference position sensor that is not illustrated and based on a drive amount of the motor 59, the control unit 58 is able to obtain information on the position of the head unit 50 in the V-axis direction.

In the structure described above, when the second pinions 67 rotate by being driven by the motor 59, the second member 63 moves in the V-axis direction. Since the guide member 61 illustrated in FIGS. 4 and 5, that is, the first rack 61*a*, is provided in a fixed manner, the first pinion 65 provided on the second member 63 moving in the V-axis direction rotates due to meshing engagement with the first rack 61*a*.

Since the first pinion 65 is in mesh with the second rack 62*a* provided on the head unit 50, due to the rotation of the first pinion 65, the head unit 50 moves in such a way as to be pushed in the V-axis direction.

For example, when the second member 63 moves in the +V direction by being driven by the motor 59 in a state in which the head unit 50 is located at the recording position illustrated in FIG. 4, the first pinion 65 located on the right side in FIG. 4 rotates counterclockwise in FIG. 4, and the first pinion 65 located on the left side in FIG. 4 rotates clockwise in FIG. 4. This causes the head unit 50 to move in the +V direction.

When the second member 63 moves in the −V direction by being driven by the motor 59 in a state in which the head unit 50 is located at the retraction position illustrated in FIG. 5, the first pinion 65 located on the right side in FIG. 5 rotates clockwise in FIG. 5, and the first pinion 65 located on the left side in FIG. 5 rotates counterclockwise in FIG. 5. This causes the head unit 50 to move in the −V direction.

To be exact, a force for movement in the −V direction acts on the head unit 50 due to the action of gravity. This is because the −V direction includes a −Z-directional component. Therefore, when the head unit 50 moves in the −V direction, the movement mechanism 60 applies a +V-directional force to the head unit 50 and is thus in a state of restricting the gravitational movement of the head unit 50 in the −V direction. However, the movement mechanism 60 applies a −V-directional force to the head unit 50 after the head unit 50 comes into contact with the adjustment cams 80 to be described later (see FIG. 10). This will be described later.

When the head unit 50 moves in the +V direction, the movement mechanism 60 applies a +V-directional force to the head unit 50.

The range, in the V-axis direction, denoted as M1 in FIGS. 4 and 5 is a moving range of the second member 63, with the center of rotation of the first pinion 65 taken as a reference. The range, in the V-axis direction, denoted as M2 in FIGS. 4 and 5 is a moving range of the head unit 50, with the position of the −V-side end of the second rack forming member 62 taken as a reference.

As described above, though the head unit 50 is configured to move in the V-axis direction due to the rotation of the first pinions 65, the first pinions 65 themselves also are configured to move in the V-axis direction. For this reason, the moving range M2 of the head unit 50 is wider than the moving range M1 of the second member 63. In the present embodiment, the moving range M2 is approximately twice as wide as the moving range M1.

As described above, the movement mechanism 60 includes the guide member 61 on which the first rack 61*a* is formed in the moving direction of the head unit 50, the first pinion 65 which is in mesh with the first rack 61*a*, the second rack 62*a* which is provided on the head unit 50 at a position where it faces the first rack 61*a* and is formed in the V-axis direction, that is, the moving direction of the head unit 50, and is in mesh with the first pinion 65, and the second member 63, on which the first pinion 65 is provided rotatably and which is able to move in the V-axis direction by receiving the power of the motor 59. Due to the rotation of the first pinion 65 configured to move in the V-axis direction, a moving amount of the head unit 50 is larger than a moving amount of the second member 63. In other words, it is possible to secure a sufficient moving amount of the head unit 50 while suppressing a moving amount of the second member 63. Therefore, it is possible to prevent an increase in size of a mechanism configured to move the second member 63. Specifically, in the present embodiment, it is possible to reduce the length of the third rack 64*a* in the V-axis direction. Consequently, it is possible to prevent an increase in size of the printer 1.

Moreover, since the movement mechanism 60 is provided on each of the two sides of the head unit 50 in the Y-axis direction, it is possible to make a V-directional moving amount on one end side of the head unit 50 in the Y-axis direction equal to a V-directional moving amount on the other end side of the head unit 50 in the Y-axis direction. By this means, it is possible to move the head unit 50 in the V-axis direction while keeping the positional orientation of the head unit 50 properly.

The face-width direction of the first rack 61*a*, the second rack 62*a*, and the first pinion 65 is along the F-axis direction. The F-axis direction is substantially along the direction in which the head unit 50 is attachable and detachable. Because of this structure, when the head unit 50 is attached/detached, the meshing engagement of the first rack 61*a* with the first pinion 65 and the meshing engagement of the first pinion 65 with the second rack 62*a* do not obstruct the attachment/detachment work. Therefore, it is possible to attach/detach the head unit 50 easily.

In addition, even if vibration of the first pinion 65 in the face-width direction occurs when the second member 63 moves, it is hard for the vibration to be transmitted to the second rack 62*a*, that is, to the head unit 50; therefore, it is possible to protect the head unit 50 from the vibration and thus prevent the head unit 50 from breaking down.

The face-width direction of the first rack 61*a*, the second rack 62*a*, and the first pinion 65 is along the F-axis direction, and is, in the present embodiment, slightly at an angle with respect to the direction in which the head unit 50 is attachable and detachable. However, it may be parallel to the direction in which the head unit 50 is attachable and detachable.

Furthermore, it is possible to move the second member 63 in the V-axis direction while keeping the positional orientation of the second member 63 properly because a plurality of third racks 64*a* and a plurality of second pinions 67 are provided in the Y-axis direction as illustrated in FIG. 3. This makes it also possible to move the head unit 50 while keeping the positional orientation of the head unit 50 properly.

Next, the structure of the head unit 50 will now be further explained.

As described earlier, the head unit 50 includes the unit body 50*a*, which includes the line head 51, and the second rack forming members 62 as an example of a displacement member.

The unit body 50*a* has engagement pins 50*d* (see FIG. 10), as portions for engagement with the second rack forming member 62, on each of the two sides in the Y-axis direction. Specifically, two engagement pins 50*d* are provided on each of the two sides of the unit body 50*a* in the Y-axis direction, with a space therebetween in the V-axis direction. Two guide holes 62*b* extending in the V-axis direction are provided in the second rack forming member 62, with a space therebetween in the V-axis direction. The engagement pins 50*d* are inserted in the guide holes 62*b*. This structure makes a relative position between the unit body 50*a* and the second rack forming member 62 changeable while coupling them to each other.

A spring 55, which is an example of a pushing member, is provided between the unit body 50*a* and the second rack forming member 62 (see FIG. 6, too). In the present embodiment, the spring 55 is a helical compression spring. However, the spring 55 is not limited to a helical compression spring. It may be a helical tension spring or a helical torsion spring, etc. as long as it is able to exert a force F3 to be described later (see FIG. 11) between the unit body 50*a* and the second rack forming member 62.

In FIG. 10, the reference sign 50*c* denotes a spring bearing portion of the unit body 50*a*, and the reference sign 62*c* denotes a spring bearing portion of the second rack forming member 62. The spring 55 exerts a pushing force between the spring bearing portion 50*c* and the spring bearing portion 62*c*. The pushing force acts to increase the interval between the spring bearing portion 50*c* and the spring bearing portion 62*c*.

When the head unit 50 is not in contact with the adjustment cams 80 to be described below, the spring 55 is in a most-expanded state between the spring bearing portion 50*c* and the spring bearing portion 62*c*, and the engagement pins 50*d* are located at the −V-side end of the guide holes 62*b*.

Figure 14:
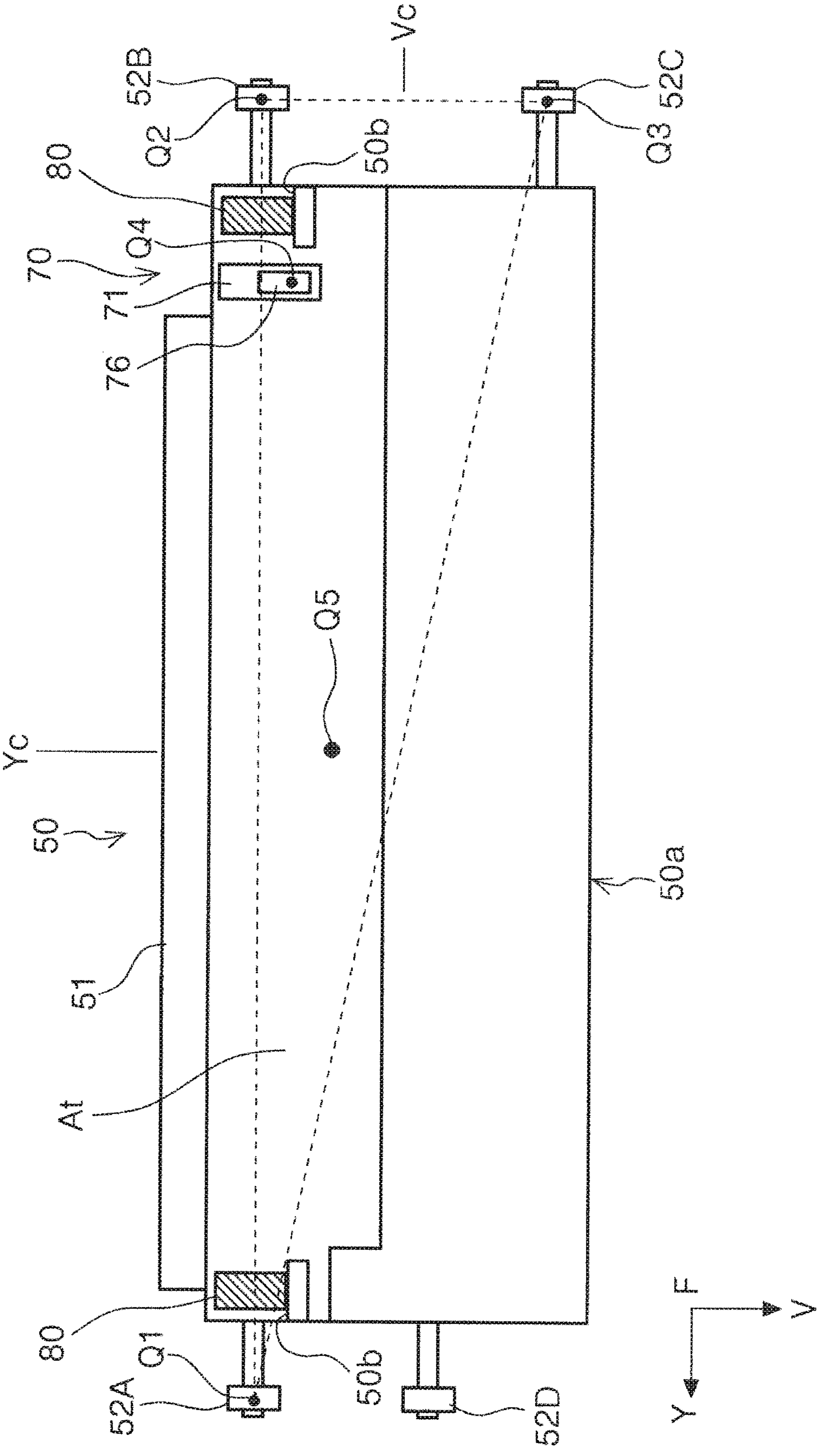
FIG. 14 is a plan view illustrating the head unit and the unit pusher in the state in which the head unit is located at the recording position.

Next, the adjustment cams 80, which are provided on the −V-directional side with respect to the head unit 50, will now be described. The adjustment cam 80 is able to rotate on an eccentric shaft 81 by receiving power from a motor that is not illustrated. As illustrated in FIG. 14, the adjustment cam 80 is provided for each of the two side portions of the head unit 50 in the Y-axis direction. In FIG. 14, the adjustment cams 80 are hatched for illustrative purpose.

The head unit 50 has a cam contact surface 50*b* for contact with the adjustment cam 80. As illustrated in FIG. 14, the cam contact surface 50*b* is provided on each of the two side portions of the head unit 50 in the Y-axis direction.

The cam contact surface 50*b* comes into contact with the adjustment cam 80, thereby defining the recording position of the head unit 50. That is, the adjustment cam 80 serves as a positioning portion with which a part of the head unit 50 moving from the retraction position toward the recording position comes into contact for positioning the head unit 50 at the recording position.

Since the adjustment cam 80 is configured to rotate on the eccentric shaft 81, it is possible to adjust the position of the cam contact surface 50*b* in the V-axis direction, that is, the recording position, by the rotation of the adjustment cam 80. The adjustment of the recording position is made based on, for example, the thickness of the medium on which recording is to be performed.

When the head unit 50 is moved to the recording position by driving the motor 59, the control unit 58 (see FIG. 3) further drives the motor 59 from a state in which the cam contact surface 50*b* has come into contact with the adjustment cam 80, thereby moving the second rack forming member 62 in the −V direction. The unit body 50*a* does not move in the −V direction in this process because of the contact of the cam contact surface 50*b* with the adjustment cam 80, and, therefore, the second rack forming member 62 alone moves in the −V direction as depicted by a change from FIG. 10 to FIG. 11. The spring 55 contracts due to this relative movement of the second rack forming member 62 in relation to the unit body 50*a*, thereby exerting the force F3 illustrated in FIG. 11 on the unit body 50*a*.

As described above, the head unit 50 includes: the unit body 50*a* having the line head 51, the second rack forming member 62 whose relative position in relation to the unit body 50*a* is changeable in the moving direction of the head unit 50, and the spring 55 provided between the unit body 50*a* and the second rack forming member 62 and serving as a pushing member configured to push the unit body 50*a* toward the adjustment cam 80 when the head unit 50 is located at the recording position. The movement mechanism 60 is configured to apply, to the second rack forming member 62, a force for moving the head unit 50. Because of this structure, high stop precision is not required when stopping the head unit 50 moved to the recording position by the movement mechanism 60 in a state in which the unit body 50*a* has come into contact with the adjustment cam 80. This makes the position control of the head unit 50 easier.

Figure 11:
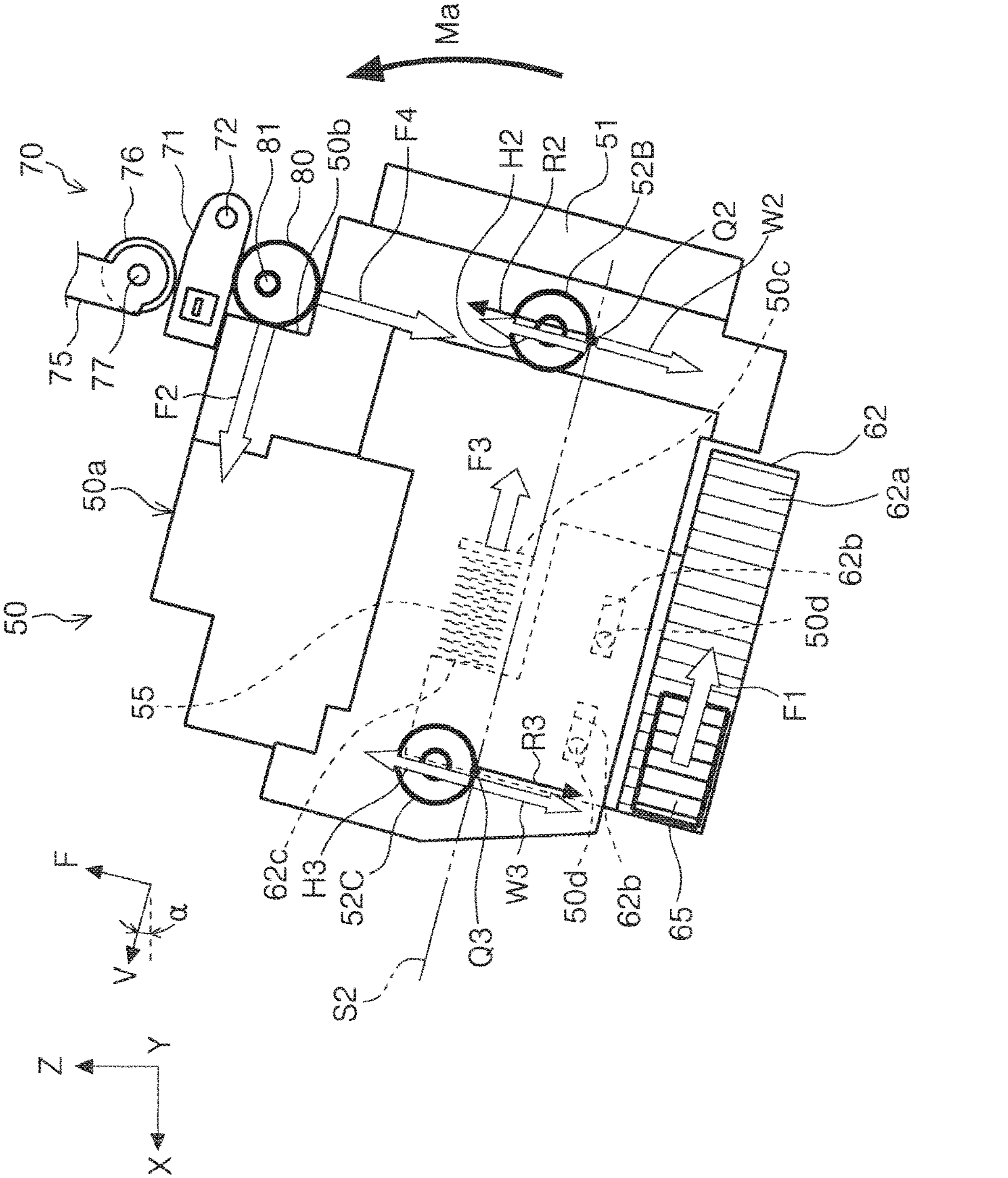
FIG. 11 is a side view illustrating the head unit and the unit pusher in the state in which the head unit is located at the recording position.

In a state illustrated in FIG. 11, the first pinion 65 exerts a force F1 in the −V direction on the second rack forming member 62. For the purpose of keeping this state, the control unit 58 (see FIG. 3) may perform the hold control of the motor 59.

Moreover, in this state, the unit body 50*a* receives a reaction force F2 in the +V direction from the adjustment cam 80 at the position of the cam contact surface 50*b*.

The direction of the reaction force F2 is the opposite of the direction of the force F1. In addition, the position where the reaction force F2 acts is away from the position where the force F1 acts. Therefore, a moment of force Ma for counterclockwise rotation in FIG. 11 acts on the head unit 50.

Both the force F1 and the reaction force F2 act at the +Y-side lateral portion and the −Y-side lateral portion. In the present embodiment, the magnitude of the force F1 acting at the +Y-side lateral portion is almost the same as the magnitude of the force F1 acting at the −Y-side lateral portion. In addition, the magnitude of the reaction force F2 acting at the +Y-side lateral portion is almost the same as the magnitude of the reaction force F2 acting at the −Y-side lateral portion. Therefore, the magnitude of the moment of force Ma acting at the +Y-side lateral portion is also almost the same as the magnitude of the moment of force Ma acting at the −Y-side lateral portion.

The moment of force Ma acts on the third guided roller 52C as a pushing force R3 to push it against the second guide surface S2. In addition, the moment of force Ma acts on the second guided roller 52B as a lifting force R2 to lift it away from the second guide surface S2.

The pushing force R3 assists the force of contact W3 of the third guided roller 52C with the second guide surface S2 due to the own weight of the head unit 50. Therefore, the third guided roller 52C does not get lifted away from the second guide surface S2. By contrast, the lifting force R2 acts in such orientation that cancels the force of contact W2 of the second guided roller 52B with the second guide surface S2 due to the own weight of the head unit 50. Therefore, if the lifting force R2 surpasses the force W2, the second guided roller 52B gets lifted away from the second guide surface S2. Since this will make the positional orientation of the head unit 50 improper, there is a risk that the quality of recording might be affected.

Since the head unit 50 is supported at one point via the first guided roller 52A on its +Y-side lateral portion, the first guided roller 52A does not get lifted away from the first guide surface S1-1 of the first guided roller 52A; however, because of susceptibility to rotation around the first guided roller 52A, the positional orientation of the head unit 50 is unstable due to the effect of the moment of force Ma.

The greater the magnitude of the force F1 is, the greater the magnitude of the moment of force Ma is. The greater the magnitude of the force F3 is, the greater the magnitude of the moment of force Ma is. The greater the distance between the position where the force F1 acts and the position where the reaction force F2 acts in the F-axis direction, the greater the magnitude of the moment of force Ma is.

In the present embodiment, in order to suppress the instability in the positional orientation of the head unit 50 due to the moment of force Ma, a unit pusher 70 configured to exert, on the head unit 50, a pushing force F4 acting in a direction of canceling the rotation caused by the moment of force Ma is provided. In the present embodiment, the unit pusher 70 is provided near the −Y-side end portion of the head unit 50 in the Y-axis direction as illustrated in FIG. 14.

Figure 12:
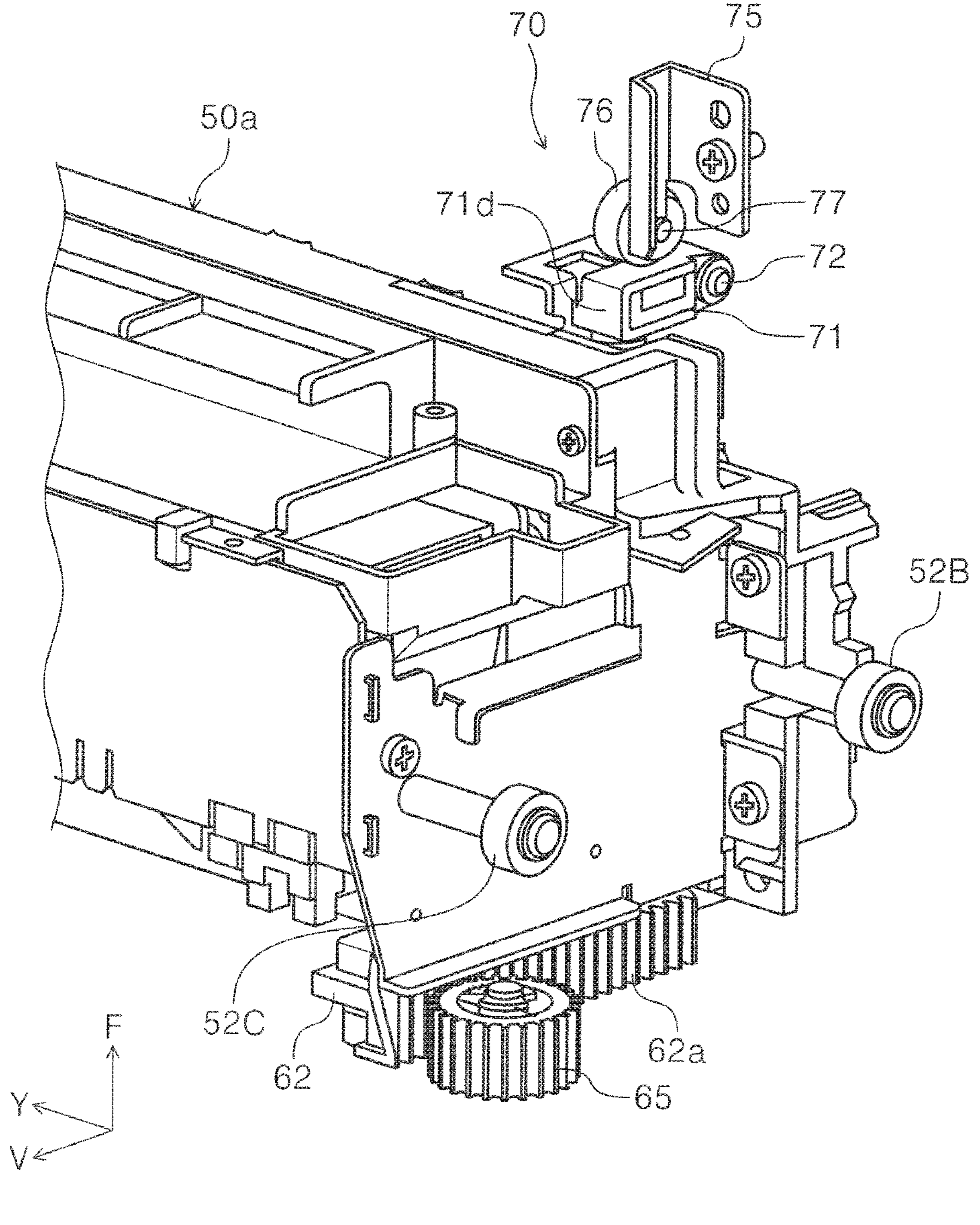
FIG. 12 is a perspective view illustrating the head unit and the unit pusher in the state in which the head unit is located at the recording position.

As illustrated in FIG. 12, the unit pusher 70 includes: a rotary member 71 provided rotatably on the head unit 50 and having a free end 71*d*, a spring 73 (see FIG. 13) provided on the head unit 50 and configured to push the rotary member 71 in a direction in which the free end 71*d* goes away from the head unit 50 (the +F direction), and a driven roller 76 provided independently of the head unit 50 and configured to come into contact with the rotary member 71 when the head unit 50 is located at the recording position. The driven roller 76 is an example of a contact member configured to come into contact with the rotary member 71.

Since the unit pusher 70 includes the rotary member 71, the spring 73, and the driven roller 76 as described above, it is possible to make the structure of the unit pusher 70 simple.

More specifically, the driven roller 76 is provided rotatably on a support member 75 via a rotation shaft 77. In the present embodiment, a single driven roller 76 is provided at a position where it interacts with the rotary member 71 in the Y-axis direction.

In FIGS. 10 to 13, the rotary member 71 is provided on the unit body 50*a* in such a way as to be able to rotate on a rotation shaft 72. The axial centerline of the rotation shaft 72 extends in the Y-axis direction, and the free end 71*d* is located on the +V-directional side with respect to the rotation shaft 72.

As illustrated in FIG. 13, the spring 73 is provided under the rotary member 71 and pushes the rotary member 71 in the direction in which the free end 71*d* goes away from the head unit 50 (the +F direction). Due to the urging force of the spring 73, the rotary member 71 is pushed clockwise in FIG. 13. In the present embodiment, the spring 73 is a helical compression spring. However, the spring 73 is not limited to a helical compression spring. It may be a helical tension spring or a helical torsion spring, etc. as long as it is able to push the rotary member 71 clockwise in FIG. 13.

Figure 13A:
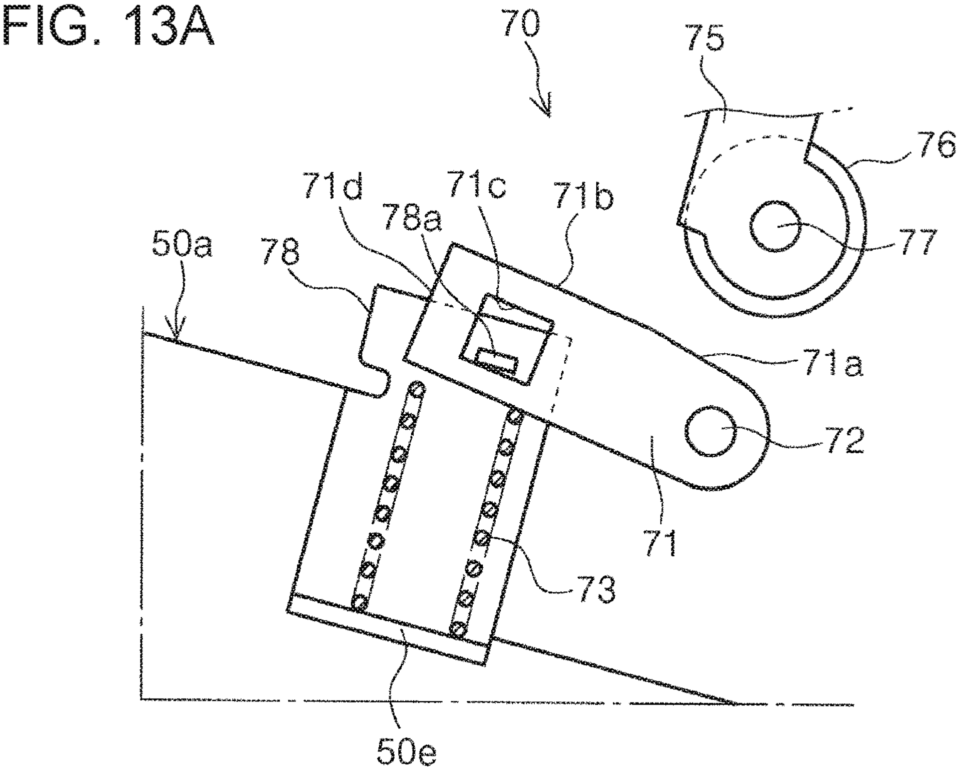
FIG. 13A is a side view illustrating a part of the head unit and the unit pusher in a state in which the head unit is located before the recording position.

As illustrated in FIG. 13, the unit body 50*a* includes a rotation restriction member 78. The rotation restriction member 78 includes a rotation restriction portion 78*a* having a protrusion shape. The rotation restriction portion 78*a* is inserted in a window hole 71*c* formed in the rotary member 71. Because of this structure, in a state in which the rotary member 71 is away from the driven roller 76, as illustrated in FIG. 13A, the lower edge of the window hole 71*c* is in contact with the rotation restriction portion 78*a* so as to restrict the clockwise rotation of the rotary member 71 in FIG. 13.

Figure 13B:
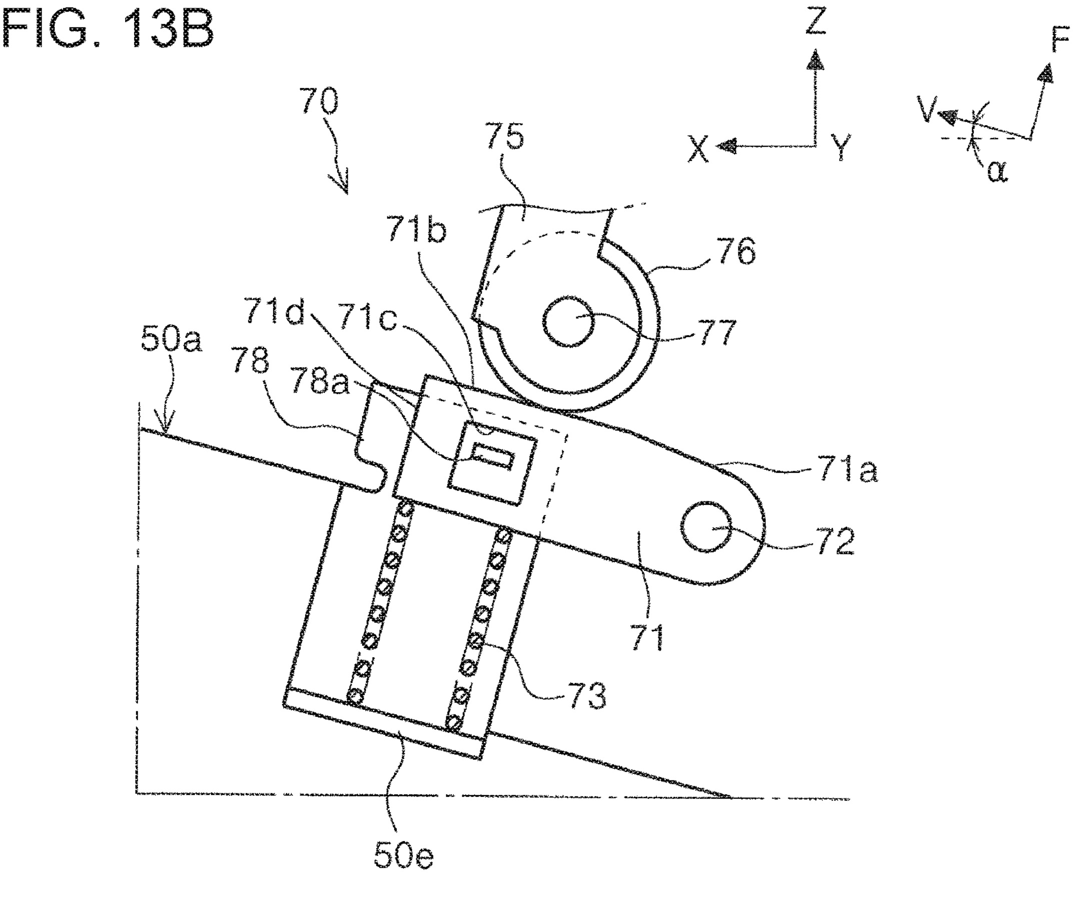
FIG. 13B is a side view illustrating a part of the head unit and the unit pusher in the state in which the head unit is located at the recording position.

When the head unit 50 moves from this state toward the recording position, the rotary member 71 comes into contact with the driven roller 76 and rotates counterclockwise as depicted by a change from FIG. 13A to FIG. 13B. This causes the contraction of the spring 73, and the urging force of the spring 73 acts on a spring bearing 50*e* provided for the spring 73. This urging force serves as the pushing force F4 illustrated in FIG. 11.

The urging force of the spring 73 counteracts the lifting force R2. The magnitude of the urging force of the spring 73 is set such that the second guided roller 52B will never get lifted away from the second guide surface S2.

As described above, the printer 1 includes the unit pusher 70 configured to apply, to the head unit 50, the pushing force F4 (see FIG. 11) acting in a direction of canceling the rotation of the head unit 50 when the head unit 50 is located at the recording position. The pushing force F4 applied by the unit pusher 70 causes the second guided roller 52B to be pushed against the second guide surface S2 in spite of the lifting force R2. This makes it possible to suppress the instability in the positional orientation of the head unit 50 due to the moment of force Ma and thus obtain good recording quality.

Since the unit pusher 70 behaves to cancel the rotation of the head unit 50 by pushing the head unit 50 in a direction intersecting with the moving direction of the head unit 50, it is possible to prevent the unit pusher 70 from being obstructive to the movement of the head unit 50 in the V-axis direction. Consequently, it is possible to prevent an increase in cost and an increase in power consumption resulting from increasing the rated output of the motor 59 (see FIG. 3), which is the power source for movement of the head unit 50.

In the present embodiment, the direction in which the head unit 50 is pushed by the unit pusher 70 is the −F direction, which is orthogonal to the V-axis direction, in which the head unit 50 is configured to move. However, the pushing direction of the unit pusher 70 is not limited to this direction but may be any direction intersecting with the V-axis direction, in which the head unit 50 is configured to move.

The head unit 50 includes the first guided roller 52A on one end portion in the Y-axis direction (+Y-side end portion) and the second guided roller 52B and the third guided roller 52C on the other end portion in the Y-axis direction (−Y-side end portion) with a space therebetween in the moving direction of the head unit 50. The first guided roller 52A is guided in the moving direction of the head unit 50 while being supported by the first guide surface S1-1, S1-2 (see FIG. 8) extending in the moving direction of the head unit 50. The second guided roller 52B and the third guided roller 52C are guided in the moving direction of the head unit 50 while being supported by the second guide surface S2 (see FIG. 7) extending in the moving direction of the head unit 50. At least in a state of being located at the recording position, the head unit 50 is supported at three points via the first guided roller 52A, the second guided roller 52B, and the third guided roller 52C. This makes the positional orientation of the head unit 50 at the recording position stable, resulting in good recording quality.

In FIG. 14, the reference sign Q1 denotes a first position where the first guided roller 52A is in contact with the first guide surface S1-1, the reference sign Q2 denotes a second position where the second guided roller 52B is in contact with the second guide surface S2, and the reference sign Q3 denotes a third position where the third guided roller 52C is in contact with the second guide surface S2. The reference sign Q4 denotes a fourth position where the unit pusher 70 applies the pushing force F4 to the head unit 50. In the present embodiment, the fourth position Q4 is located inside an area At of a triangle having vertices at the first position Q1, the second position Q2, and the third position Q3 as viewed in a direction orthogonal to a plane including the first position Q1, the second position Q2, and the third position Q3 (+F direction).

Because of this structure, the first guided roller 52A is properly pushed against the first guide surface S1-1, the second guided roller 52B is properly pushed against the second guide surface S2, and the third guided roller 52C is properly pushed against the second guide surface S2. Consequently, the positional orientation of the head unit 50 is stable, and it is possible to obtain good recording quality.

However, the fourth position Q4 may be located on an edge of the area At. Alternatively, the fourth position Q4 may be located outside the area At.

In FIG. 14, the reference sign Q5 denotes the position of the barycenter of the head unit 50 when viewed in a direction orthogonal to a plane including the first position Q1, the second position Q2, and the third position Q3 (+F direction). The barycenter Q5 is located inside the area At of the triangle having vertices at the first position Q1, the second position Q2, and the third position Q3. Because of this structure, the positional orientation of the head unit 50 is stable.

As described above, the second guided roller 52B is located at a position where it gets lifted away from the second guide surface S2 due to the rotation of the head unit 50 caused by the moment of force Ma, and the third guided roller 52C is located at a position where it is pushed against the second guide surface S2 due to the rotation of the head unit 50 caused by the moment of force Ma. The fourth position Q4 where the unit pusher 70 applies the pushing force F4 to the head unit 50 is located on the side closer to the second position Q2 with respect to a halfway position Yc located between the first position Q1 and the second position Q2 in the Y-axis direction. In addition, the fourth position Q4 is located on the side closer to the second position Q2 with respect to a halfway position Vc located between the second position Q2 and the third position Q3 in the V-axis direction.

Because of this structure, the head unit 50 is pushed at the position closer to the second guided roller 52B, and the rotation of the head unit 50 is suppressed properly.

Notwithstanding the above description, the fourth position Q4 may be located at the halfway position Yc, or on the side closer to the first position Q1 with respect to the halfway position Yc, in the Y-axis direction. Similarly, the fourth position Q4 may be located at the halfway position Vc, or on the side closer to the third position Q3 with respect to the halfway position Vc, in the V-axis direction.

The axial centerline of the rotation shaft 72 of the rotary member 71 extends in the Y-axis direction, and the free end 71*d* is located on the +V-directional side with respect to the rotation shaft 72 in the V-axis direction, namely, on the side closer to the retraction position. The driven roller 76 is configured to move in relation to the rotary member 71 from the rotation shaft 72 toward the free end 71*d* when the head unit 50 moves from the retraction position to the recording position. Because of this structure, the magnitude of the force applied by the unit pusher 70 to the head unit 50 increases gradually when the head unit 50 moves from the retraction position to the recording position. That is, such a gradual increase in the magnitude of the pushing force makes it possible to avoid a heavy load from being applied suddenly when the head unit 50 moves to the recording position, thereby ensuring smooth movement of the head unit 50 to the recording position.

As illustrated in FIG. 13, the surface of the rotary member 71 for contact with the driven roller 76 is made up of a first contact surface 71*a* and a second contact surface 71*b*, which is at a predetermined angle with respect to the first contact surface 71*a*. When the head unit 50 moves to the recording position, the first contact surface 71*a* comes into contact with the driven roller 76 first. The first contact surface 71*a* fulfills a function of guiding the driven roller 76 to the second contact surface 71*b* at the time of switching from a state illustrated in FIG. 13A to a state illustrated in FIG. 13B, thereby enabling the head unit 50 to move to the recording position more smoothly.

The unit pusher 70 further includes the rotation restriction portion 78*a* that restricts the rotation of the rotary member 71 in the direction in which the free end 71*d* of the rotary member 71 goes away from the head unit 50. Because of this structure, it is possible to make a contact angle smaller when the driven roller 76 comes into contact with the rotary member 71. The smaller contact angle further enhances the effect of avoiding a heavy load from being applied suddenly when the head unit 50 moves to the recording position.

In the present embodiment, the load applied to the rotary member 71 is reduced by using the driven roller 76 as the contact member configured to come into contact with the rotary member 71. However, any other kind of fixed member may be used as the contact member in place of the driven roller 76.

The scope of the present disclosure is not limited to the foregoing embodiments. The present disclosure can be modified in various ways within the scope of the recitation of appended claims. Needless to say, such modifications are within the scope of the present disclosure.

What is claimed is:

1. A recording apparatus, comprising:

a medium transportation path along which a medium is transported;

a recording head that performs recording on the medium transported along the medium transportation path;

a head unit including the recording head and configured to move between a recording position where the recording is performed on the medium and a retraction position away from the medium transportation path;

a movement mechanism that moves the head unit by applying, to the head unit, a force acting in a moving direction of the head unit;

a positioning portion with which a part of the head unit moving from the retraction position toward the recording position comes into contact for positioning the head unit at the recording position; and a unit pusher that applies, to the head unit, a force acting in a direction of canceling rotation of the head unit when the head unit is located at the recording position, wherein a moment for rotating the head unit as viewed in a medium width direction intersecting with a medium transportation direction is produced by the force applied by the movement mechanism to the head unit and by a reaction force received by the head unit from the positioning portion, and the unit pusher pushes the head unit in a direction intersecting with the moving direction of the head unit.

2. The recording apparatus according to claim 1, wherein the head unit includes a first guided portion on one end portion in the medium width direction and a second guided portion and a third guided portion on an other end portion in the medium width direction with a space therebetween in the moving direction of the head unit, the first guided portion is guided in the moving direction while being supported by a first guide surface extending in the moving direction of the head unit, the second guided portion and the third guided portion are guided in the moving direction while being supported by a second guide surface extending in the moving direction, and at least in a state of being located at the recording position, the head unit is supported at three points via the first guided portion, the second guided portion, and the third guided portion.

3. The recording apparatus according to claim 2, wherein a position where the unit pusher applies the force to the head unit is located inside an area of a triangle having vertices at a first position, a second position, and a third position as viewed in a direction orthogonal to a plane including the first position, the second position, and the third position, the first position is a position where the first guided portion is in contact with the first guide surface, the second position is a position where the second guided portion is in contact with the second guide surface, and the third position is a position where the third guided portion is in contact with the second guide surface.

4. The recording apparatus according to claim 3, wherein the second guided portion is located at a position where the second guided portion gets lifted away from the second guide surface due to the rotation of the head unit, the third guided portion is located at a position where the third guided portion is pushed against the second guide surface due to the rotation of the head unit, and the position where the unit pusher applies the force to the head unit is located on a side closer to the second position with respect to a halfway position located between the first position and the second position in the medium width direction, and is located on a side closer to the second position with respect to a halfway position located between the second position and the third position in the moving direction.

5. The recording apparatus according to claim 1, wherein the unit pusher includes a rotary member provided rotatably on the head unit and having a free end, a spring provided on the head unit and configured to push the rotary member in a direction in which the free end goes away from the head unit, and a contact member provided independently of the head unit and configured to come into contact with the rotary member when the head unit is located at the recording position, and the force acting in the direction of canceling the rotation of the head unit is applied to the head unit by a force of the spring.

6. The recording apparatus according to claim 5, wherein a centerline of a rotation shaft of the rotary member extends in the medium width direction, the free end is located on a side closer to the retraction position with respect to the rotation shaft in the moving direction of the head unit, and the contact member moves in relation to the rotary member from the rotation shaft toward the free end when the head unit moves from the retraction position to the recording position.

7. The recording apparatus according to claim 6, further comprising:

a rotation restriction portion that restricts rotation of the rotary member in the direction in which the free end of the rotary member goes away from the head unit.

8. The recording apparatus according to claim 1, wherein the head unit includes a unit body including the recording head and configured to come into contact with the positioning portion, a displacement member whose relative position in relation to the unit body is configured to be changed in the moving direction of the head unit, and a pushing member provided between the unit body and the displacement member and configured to push the unit body toward the positioning portion when the head unit is located at the recording position, and the movement mechanism applies, to the displacement member, an external force for moving the head unit.

* * * * *